United States Patent
Denoual et al.

(10) Patent No.: US 11,805,302 B2
(45) Date of Patent: Oct. 31, 2023

(54) METHOD, DEVICE, AND COMPUTER PROGRAM FOR TRANSMITTING PORTIONS OF ENCAPSULATED MEDIA CONTENT

(71) Applicant: CANON KABUSHIKI KAISHA, Tokyo (JP)

(72) Inventors: Franck Denoual, Saint Domineuc (FR); Naël Ouedraogo, Maure de Bretagne (FR); Frédéric Maze, Langan (FR); Hervé Ruellan, Rennes (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/956,308

(22) PCT Filed: Dec. 19, 2018

(86) PCT No.: PCT/EP2018/085912
§ 371 (c)(1),
(2) Date: Jun. 19, 2020

(87) PCT Pub. No.: WO2019/121963
PCT Pub. Date: Jun. 27, 2019

(65) Prior Publication Data
US 2020/0329284 A1 Oct. 15, 2020

(30) Foreign Application Priority Data

Dec. 22, 2017 (GB) ...................................... 1721847
Apr. 5, 2018 (GB) ...................................... 1805719

(51) Int. Cl.
*H04N 21/845* (2011.01)
*H04L 67/02* (2022.01)
(Continued)

(52) U.S. Cl.
CPC ......... *H04N 21/8456* (2013.01); *H04L 65/65* (2022.05); *H04L 67/02* (2013.01); *H04N 21/85406* (2013.01)

(58) Field of Classification Search
CPC ......... H04N 21/8456; H04N 21/85406; H04N 21/64322; H04N 21/26258;
(Continued)

(56) References Cited

U.S. PATENT DOCUMENTS

2004/0194142 A1 9/2004 Jiang et al.
2012/0023254 A1 1/2012 Park et al.
(Continued)

FOREIGN PATENT DOCUMENTS

EP 2615790 A1 7/2013
EP 2759113 A1 7/2014
(Continued)

OTHER PUBLICATIONS

Ingo Kofler, et al., Implications of the ISO Base Media File Format on Adaptive HTTP Streaming of H.264/SVC, 4th IEEE International Workshop on Future Multimedia Networking, Jan. 14, 2012, pp. 549-553, IEEE, XP032160856.

*Primary Examiner* — Caroline H Jahnige
(74) *Attorney, Agent, or Firm* — Canon U.S.A., Inc. IP Division

(57) ABSTRACT

According to embodiments, the invention provides a method for transmitting encapsulated media data from a server to a client, the media data being requested by the client, the method being carried out by the server and comprising:
—identifying at least one byte-range of the encapsulated media data to be transmitted, the at least one byte-range representing a portion of the encapsulated media data;
—obtaining a processing level of the at least one identified byte-range, the processing level being indicative of the role
(Continued)

of data contained in the at least one identified byte-range for processing the encapsulated media data; and—sending the at least one identified byte-range and an item of information determined as a function of the obtained processing level to the client.

8 Claims, 10 Drawing Sheets

(51) Int. Cl.
  *H04N 21/854* (2011.01)
  *H04L 65/65* (2022.01)
(58) Field of Classification Search
  CPC ....... H04N 21/2323; H04N 21/234381; H04N 21/2402; H04N 21/44209; H04N 21/4621; H04N 21/235; H04L 65/608; H04L 67/02; H04L 65/602; H04L 65/607; H04L 69/161; H04L 69/164; H04L 65/4084; H04L 65/80; H04L 69/321; H04L 65/604; H04L 67/322; H04L 47/24; H04L 47/19; H04L 69/12; H04L 65/762
  See application file for complete search history.

(56) References Cited

U.S. PATENT DOCUMENTS

| | | | |
|---|---|---|---|
| 2016/0011923 | A1* | 1/2016 | Walker ............. H04N 21/45457 714/49 |
| 2017/0187778 | A1 | 6/2017 | Radha et al. |
| 2018/0035176 | A1* | 2/2018 | Stockhammer .. H04N 21/23439 |
| 2019/0052937 | A1* | 2/2019 | Malamal Vadakital ..................... H04L 65/607 |

FOREIGN PATENT DOCUMENTS

| | | |
|---|---|---|
| EP | 3131253 A1 | 2/2017 |
| GB | 2513140 A | 10/2014 |
| WO | 2013/044025 A2 | 3/2013 |
| WO | 2016/090280 A1 | 6/2016 |
| WO | 2016/140915 A1 | 9/2016 |
| WO | 2017/092830 A1 | 6/2017 |

* cited by examiner

METHOD, DEVICE, AND COMPUTER PROGRAM FOR TRANSMITTING PORTIONS OF ENCAPSULATED MEDIA CONTENT

FIELD OF THE INVENTION

The present invention relates to a method, a device, and a computer program for encapsulating and parsing media data, making it possible to transmit portions of encapsulated media content.

BACKGROUND OF THE INVENTION

The invention relates to encapsulating, parsing, and streaming media content, e.g. according to ISO Base Media File Format as defined by the MPEG standardization organization, to provide a flexible and extensible format that facilitates interchange, management, editing, and presentation of group of media content and to improve its delivery for example over an IP network such as the Internet using adaptive http streaming protocol.

The International Standard Organization Base Media File Format (ISO BMFF, ISO/IEC 14496-12) is a well-known flexible and extensible format that describes encoded timed media data bit-streams either for local storage or transmission via a network or via another bit-stream delivery mechanism. This file format has several extensions, e.g. Part-15, ISO/IEC 14496-15 that describes encapsulation tools for various NAL (Network Abstraction Layer) unit based video encoding formats. Examples of such encoding formats are AVC (Advanced Video Coding), SVC (Scalable Video Coding), HEVC (High Efficiency Video Coding), or L-HEVC (Layered HEVC). Another example of file format extensions is the Image File Format, ISO/IEC 23008-12, that describes encapsulation tools for still images or sequence of still images such as HEVC Still Image. This file format is object-oriented. It is composed of building blocks called boxes (or data structures characterized by a four character code) that are sequentially or hierarchically organized and that define descriptive parameters of the encoded timed media data bit-stream such as timing and structure parameters. In the file format, the overall presentation over time is called a movie. The movie is described by a movie box (with four character code 'moov') at the top level of the media or presentation file. This movie box represents an initialization information container containing a set of various boxes describing the presentation. It is logically divided into tracks represented by track boxes (with four character code 'trak'). Each track (uniquely identified by a track identifier (track_ID)) represents a timed sequence of media data pertaining to the presentation (frames of video, for example). Within each track, each timed unit of data is called a sample; this might be a frame of video, audio or timed metadata. Samples are implicitly numbered in sequence. The actual samples data are in boxes called Media Data Boxes (with four character code 'mdat') at the same level as the movie box. The movie may also be fragmented, i.e. organized temporally as a movie box containing information for the whole presentation followed by a list of couple movie fragment and Media Data box. Within a movie fragment (box with four-character code 'moof') there is a set of track fragments (box with four character code 'traf'), zero or more per movie fragment. The track fragments in turn contain zero or more track run boxes ('trun'), each of which documents a contiguous run of samples for that track fragment.

In the file format, a media or presentation file may also contain one or more static items (e.g. one or more still images) described within a meta box ('meta') at the same level as the movie box. This meta box may contain descriptive information describing static items, this descriptive information being organized in several boxes (for instance, the list of items in an item information box ('iinf') and the location (in data boxes) of data items in an item location box ('iloc')), each item being uniquely identified by an item identifier (item_ID). The actual items data are stored either in an item data box ('idat') in the meta box or in a media data box ('mdat') at the file's top level.

Media data encapsulated with ISOBMFF can be used for adaptive streaming with HTTP. For example, MPEG DASH (for "Dynamic Adaptive Streaming over HTTP") and Smooth Streaming are HTTP adaptive streaming protocols enabling segment or fragment based delivery of media files. The MPEG DASH standard (see "ISO/IEC 23009-1, Dynamic adaptive streaming over HTTP (DASH), Part1: Media presentation description and segment formats") makes it possible to establish a link between a compact description of the content(s) of a media presentation and the HTTP addresses. Usually, this association is described in a file called a manifest file or description file. In the context of DASH, this manifest file is a file also called the MPD file (for Media Presentation Description). When a client device gets the MPD file, the description of each encoded and deliverable version of media content can easily be determined by the client. By reading or parsing the manifest file, the client is aware of the kind of media content components proposed in the media presentation and is aware of the HTTP addresses for downloading the associated media content components. Therefore, it can decide which media content components to download (via HTTP requests) and to play (decoding and playing after reception of the media data segments). DASH defines several types of segments, mainly initialization segments, media segments, or index segments. Initialization segments contain setup information and metadata describing the media content, typically at least the 'ftyp' and 'moov' boxes of an ISOBMFF media file. A media segment contains the media data. It can be for example one or more 'moof' plus 'mdat' boxes of an ISOBMFF file or a byte range in the 'mdat' box of an ISOBMFF file. A media segment may be further subdivided into sub-segments (also corresponding to one or more complete 'moof' plus 'mdat' boxes). The DASH manifest may provide segment URLs or a base URL to the file with byte ranges to segments for a streaming client to address these segments through HTTP requests. The byte range information may be provided by index segments or by specific ISOBMFF boxes such as the Segment Index Box 'sidx' or the SubSegment Index Box 'ssix'.

Current adaptive HTTP streaming protocols, like MPEG DASH for example, usually use TCP (Transmission Control Protocol) as transport protocol. This transport protocol provides a reliable connection between two computers on top of IP. Data transported through a TCP connection is split into TCP segments, each TCP segment being carried inside an IP packet. The use of TCP as underlying protocol ensures reliability but introduces delays due to packet retransmissions when losses occur. For low-latency video streaming applications where one constraint can be for example to remain as close to live as possible, it may be beneficial for HTTP streaming protocols to rather use unreliable transport protocols to tolerate some losses so as to avoid or at least to minimize the reception delay. One example of unreliable transport protocol is UDP (User Datagram Protocol). UDP is a simple protocol for sending data from one computer to another. It does not provide any connection or any guarantee of delivery, ordering or duplicate protection. A message transported by UDP is a datagram which is carried inside an IP packet. QUIC (Quick UDP Internet Connection) is another protocol built on top of UDP. QUIC aims to improve the transport of HTTP messages compared to HTTP/1.x or HTTP/2. Over UDP, QUIC defines a connection between a client and a server. Inside this connection, QUIC defines logical channels named streams. Inside a stream, data is carried by frames, each frame being transported inside a UDP packet. QUIC is defined as a reliable protocol since it provides over unreliable transport protocol features that were provided by TCP such as (non exhaustive list) flow control, conestion control and loss recovery. Since QUIC uses UDP, QUIC extension can provide a non-reliable delivery mode. Such non-reliable mode may be useful for low-latency video streaming over HTTP.

The inventors have observed problems when streaming encapsulated data (e.g. ISOBMFF content) with unreliable transport protocols, for example such as UDP or non-reliable extension of QUIC, that may lead to a client failure.

The present invention has been devised to address one or more of the foregoing concerns.

SUMMARY OF THE INVENTION

According to a first aspect of the invention there is provided a method for transmitting encapsulated media data from a server to a client, the media data being requested by the client, the method being carried out by the server and comprising:
  identifying at least one byte-range of the encapsulated media data to be transmitted, the at least one byte-range representing a portion of the encapsulated media data;
  obtaining a processing level of the at least one identified byte-range, the processing level being indicative of the role of data contained in the at least one identified byte-range for processing the encapsulated media data; and
  sending the at least one identified byte-range and an item of information determined as a function of the obtained processing level to the client.

Accordingly, the method of the invention makes it possible to stream partial media segments over a communication network, for example using http, in particular without inspecting media format or media packets. It gives the opportunity for the server to decide what to send first, for example without requiring an ISOBMFF parser.

According to a second aspect of the invention there is provided a method for transmitting encapsulated media data from a server to a client, the media data being requested by the client, the method being carried out by the server and comprising:
  identifying at least one byte-range of the encapsulated media data to be transmitted, the at least one byte-range representing a portion of the encapsulated media data;
  sending the at least one identified byte-range and a description of the at least one byte-range to the client, the at least one byte-range being identified as a function of a processing level indicative of the role of data contained in the at least one identified byte-range for processing the encapsulated media data.

Accordingly, the method of the invention makes it possible to stream partial media segments over a communication network, for example using http, in particular without inspecting media format or media packets. It gives the opportunity for the server to decide what to send first, for example without requiring an ISOBMFF parser.

In an embodiment, the processing level is obtained from a processing level map associated with the encapsulated media data.

In an embodiment, the processing level map is embedded within the encapsulated media data or is a file different from the encapsulated media data.

In an embodiment, the processing level map comprises a plurality of processing levels, each processing level of the plurality of processing levels being associated with at least one byte-range of the encapsulated media data.

According to a third aspect of the invention there is provided a method for transmitting encapsulated media data from a server to a client, the media data being requested by the client, the method being carried out by the server and comprising:
  sending at least a portion of the encapsulated media data to be transmitted to the client;
  sending a processing level map to the client, the processing level map comprising at least a description of at least one byte-range of the data to be transmitted and a processing level associated with the at least one byte-range.

Accordingly, the method of the invention makes it possible to stream partial media segments over a communication network, for example using http, in particular without inspecting media format or media packets. It gives the opportunity for the server and the client to decide what to send and received first, for example without requiring an ISOBMFF parser.

In an embodiment, the portion of the encapsulated media data comprises the at least one byte-range.

In an embodiment, the processing level map is embedded within the encapsulated media data or is a file different from the encapsulated media data.

In an embodiment, the processing level map comprises a plurality of processing levels, each processing level of the plurality of processing levels being associated with at least one byte-range of the encapsulated media data.

According to a fourth aspect of the invention there is provided a method for receiving encapsulated media data from a server, the media data being requested by a client, the method being carried out by the client and comprising:
  receiving, from the server, at least one byte-range of the encapsulated media data and an item of information determined as a function of a processing level associated with the at least one byte-range, the processing level being indicative of the role of data contained in the at least one received byte-range for processing the encapsulated media data;
  processing the at least one received byte-range as a function of the received item of information.

Accordingly, the method of the invention makes it possible to stream partial media segments over a communication network, for example using http, in particular without inspecting media format or media packets. It gives the opportunity for the client to cancel retransmission of less important data.

According to a fifth aspect of the invention there is provided a method for receiving encapsulated media data from a server, the media data being requested by a client, the method being carried out by the client and comprising:
  receiving, from the server, at least one byte-range of the encapsulated media data;
  obtaining a processing level associated with the at least one received byte-range, the processing level being indicative of the role of data contained in the at least one received byte-range for processing the encapsulated media data; and processing the at least one received byte-range as a function of the obtained processing level.

Accordingly, the method of the invention makes it possible to stream partial media segments over a communication network, for example using http, in particular without inspecting media format or media packets. It gives the opportunity for the client to cancel retransmission of less important data.

In an embodiment, the processing level is obtained from a processing level map associated with the encapsulated media data.

In an embodiment, the method further comprises a step of receiving the processing level map, the processing level map comprising at least a description of the at least one byte-range and the processing level associated with the at least one byte-range.

In an embodiment, the processing level map is received from the server.

In an embodiment, the processing level map is received prior to receiving the at least one byte-range of the encapsulated media data.

In an embodiment, the processing level map is embedded within the encapsulated media data or is a file different from the encapsulated media data.

In an embodiment, the processing level map comprises a plurality of processing levels, each processing level of the plurality of processing levels being associated with at least one byte-range of the encapsulated media data.

In an embodiment, the format of the encapsulated media data is of the ISOBMFF type or of the Partial File Format type.

According to a sixth aspect of the invention there is provided a computer program product for a programmable apparatus, the computer program product comprising a sequence of instructions for implementing each of the steps of the method described above when loaded into and executed by the programmable apparatus. The advantages of such a computer program product are similar to the ones mentioned above.

According to a seventh aspect of the invention there is provided a non-transitory computer-readable storage medium storing instructions of a computer program for implementing each of the steps of the method described above. The advantages of such a non-transitory computer-readable storage medium are similar to the ones mentioned above.

According to an eighth aspect of the invention there is provided a signal carrying an information dataset for media data, the information dataset comprising encapsulated media data and a processing level map, the processing level map comprising at least a description of at least one byte-range of the encapsulated media data and a processing level associated with the at least one byte-range. The advantages of such a signal are similar to the ones mentioned above.

According to a ninth aspect of the invention there is provided a media storage device storing a signal carrying an information dataset for media data, the information dataset comprising encapsulated media data and a processing level map, the processing level map comprising at least a description of at least one byte-range of the encapsulated media data and a processing level associated with the at least one byte-range. The advantages of such a media storage device are similar to the ones mentioned above.

According to a tenth aspect of the invention there is provided a device for transmitting or receiving encapsulated media data, the device comprising a processing unit configured for carrying out each of the steps of the method described above. The advantages of such a device are similar to the ones mentioned above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 5, comprising

FIG. 6, comprising

DETAILED DESCRIPTION OF THE INVENTION

According to embodiments, processing levels or priorities are indicated in an encapsulated media data file or in a companion file (e.g. a companion file referencing an encapsulated media data file) to give information about data significance of encapsulated data of the encapsulated media data file, the encapsulated data typically comprising media data and descriptive metadata, so that these encapsulated data may be handled appropriately. The processing levels or priorities are preferably given per byte-ranges so that no container specific parsing or container structure knowledge is required to use the priorities. The processing levels or priorities may be relative priorities among the byte ranges reflecting dependencies between the media components. These processing levels or priorities may be used at the server end for the server to adapt the transmission or to optimize its delivery (retransmission, forward error correction, etc.). These processing levels or priorities may be exchanged with the client so that only the client or both the server and the client can compute the same importance of a given item of data. When used at the server end, the processing levels or priorities may be used at application layer's level or at transport layer's level. These processing levels or priorities may be sent to the client for the client to determine which items of data may tolerate loss and/or which items of data may require retransmission. The transmission of the processing levels or priorities can be part of the setup or of the initialization information exchange or can be sent along with encapsulated media data.

The encapsulated media data may be directed to different kinds of media resources or media components such as one still image or a collection of still images, one or more video tracks with or without associated audio tracks or metadata items or tracks.

According to embodiments, the processing levels or priorities associated with a file comprising encapsulated media data are organized in a processing level map or priority map wherein each of several processing levels or pluralities is associated with predetermined byte-ranges, for example predetermined byte-ranges of the file or predetermined byte-ranges of an encapsulated portion of the file.

For the sake of illustration, three processing levels or priority levels can be used, for example a high priority level corresponding to encapsulated data that are required to de-encapsulate and/or to decode data (these data generally corresponding to a low quality level), a normal priority level corresponding to encapsulated data that make it possible to de-encapsulate and/or to decode data corresponding to a standard quality level, and a low priority level corresponding to encapsulated data that make it possible to de-encapsulate and/or to decode data corresponding to a high quality level. Of course, only two priority levels or more than three priority levels can be used.

Figure 1:
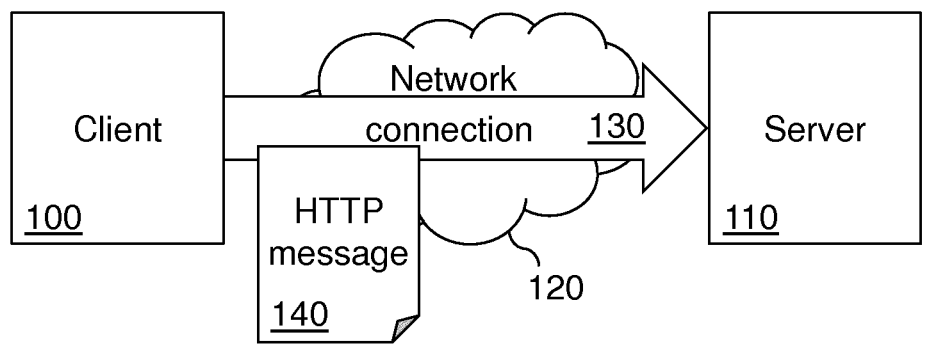
FIG. 1 illustrates the general architecture of a system comprising a server and a client exchanging HTTP messages.

FIG. 1 illustrates the general architecture of a system comprising a server and a client exchanging HTTP messages. As illustrated, the client denoted 100 sends an HTTP message denoted 140 to the server denoted 110, through a connection denoted 130 established over a network denoted 120.

According to HTTP, the client sends an HTTP request to the server that replies with an HTTP response. Both HTTP request and HTTP response are HTTP messages. For the sake of illustration, HTTP messages can be directed to the exchange of media description information, the exchange of media configuration or description, or the exchange of actual media data. The client may thus be a sender and a receiver of HTTP messages. Likewise, the server may be a sender and a receiver of HTTP messages.

No distinction is made hereafter between HTTP requests and HTTP responses. However, it is generally expected that HTTP requests are sent on a reliable basis while some HTTP responses may be sent on an unreliable basis. Indeed, a common use-case for the unreliable transmission of HTTP messages corresponds to the case according to which the server sends back to the client a media stream in an unreliable way. However, in some cases, the HTTP client could also send an HTTP request in an unreliable way, for example for sending a media stream to the server. At some point, the HTTP client and the HTTP server can also negotiate that they will run in a reliable mode. In such a case, both HTTP requests and responses are sent in a reliable way.

Figure 2:
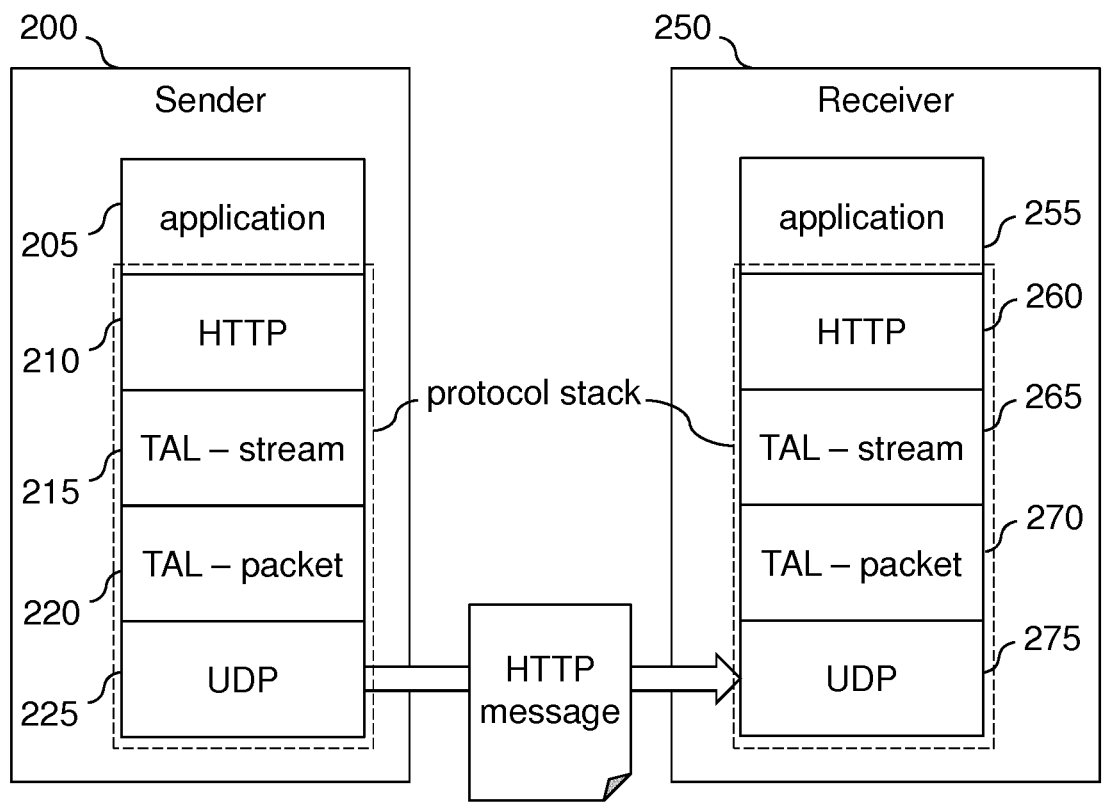
FIG. 2 illustrates an example of a protocol stack of a sender and of a receiver according to embodiments of the invention.

FIG. 2 illustrates an example of protocol stacks of a sender 200 and of a receiver 250 according to embodiments of the invention. For the sake of illustration, it may be considered that client 100 of FIG. 1 is the sender 200 of an HTTP message, typically an HTTP request, while server 110 of FIG. 1 is the receiver 250. However, it is to be noted that the principle and description below also apply when server 110 is the sender and client 100 is the receiver, typically when server 110 sends an HTTP response to client 100.

The same protocol stack exists on both sender 200 and receiver 250, making it possible to exchange data through a communication network.

At the sender's end (200), the protocol stack receives, from application 205, a message to be sent through the network, for example message 140. At the receiver's end (250), the message is received from the network and, as illustrated, the received message is processed at transport level 275 and then transmitted up to application 255 through the protocol stack that comprises several layers.

At the sender's end, the protocol stack contains the application, denoted 205, at the top level. For the sake of illustration, this can be a web application, e.g. a client part running in a web browser. In a particular embodiment, the application is a media streaming application, for example using DASH protocol, to stream media data encapsulated according to ISO Base Media File Format. Underneath is an HTTP layer denoted 210, which implements the HTTP protocol semantics, providing an API (application programming interface) for the application to send and receive messages. Underneath is a transport adaptation layer (TA layer or TAL). The TAL may be divided into two sublayers: a stream sublayer denoted 215 (TAL-stream, TA Stream sublayer, or TAS sublayer) and a packet sublayer denoted 220 (TAL-packet, TA Packet sublayer, or TAP sublayer), depending on whether the transport layer manipulates streams and packets or only packets. These sublayers enable transport of HTTP messages on top of the UDP layer denoted 225.

At the receiver's end, the protocol stack contains the same layers. For the sake of illustration, the top level application, denoted 255, may be the server part running in a web server. The HTTP layer denoted 260, the TAS sublayer denoted 265, the TAP sublayer denoted 270, and the UDP layer denoted 275 are the counterparts of the layers 205, 210, 215, 220, and 225, respectively.

From a physical point of view, an item of information to be exchanged between the client and the server is obtained at a given level at the sender's end. It is transmitted through all the lower layers down to the network, is physically sent through the network to the receiver, and is transmitted through all the lower layers at the receiver's end up to the same level as the initial level at the sender's end. For example, an item of information obtained at the HTTP layer from the application layer is encapsulated in an HTTP message. This HTTP message is then transmitted to TA stream sublayer 215, which transmits it to TA Packet sublayer 220, and so on down to the physical network. At the receiver's end, the HTTP message is received from the physical network and transmitted to TA Packet sublayer 270, through TA Stream sublayer 265, up to HTTP layer 260, which decodes it to retrieve the item of information so as to provide it to application 255.

From a logical point of view, a message is generated at any level, transmitted through the network, and received by the receiver at the same level. From this point of view, all the lower layers are an abstraction that makes it possible to transmit a message from a sender to a receiver. This logical point of view is adopted below.

According to embodiments, the transport adaptation layer (TAL) is a transport protocol built on top of UDP and targeted at transporting HTTP messages.

At a higher level, TAS sublayer provides streams that are bi-directional logical channels. When transporting HTTP messages, a stream is used to transport a request from the client to the server and the corresponding response from the server back to the client. As such, a TA stream is used for each pair of request and response. In addition, one TA stream associated with a request and response exchange is dedicated to carrying the request body and the response body.

All the header fields of the HTTP requests and responses are carried by a specific TA stream. These header fields may be encoded using HPACK when the version of HTTP in use is HTTP/2 (HPACK is a compression format for efficiently representing HTTP header fields, to be used in HTTP/2).

To transfer data belonging to a TA stream, data may be split into TA frames. One or more TA frames may be encapsulated into a TA packet which may itself be encapsulated into a UDP packet to be transferred between the client and the server. There are several types of TA frames, the STREAM frames carry data corresponding to TA streams, the ACK frames carry control information about received TA packets, and other frames are used for controlling the TA connection. There are also several types of TA packets, one of those being used to carry TA frames.

In the following, the terms TA packet and TA frame will be used interchangeably as representing data belonging to a TA stream and transported inside a UDP packet. Where necessary, the distinction will be made explicit.

Figure 3:
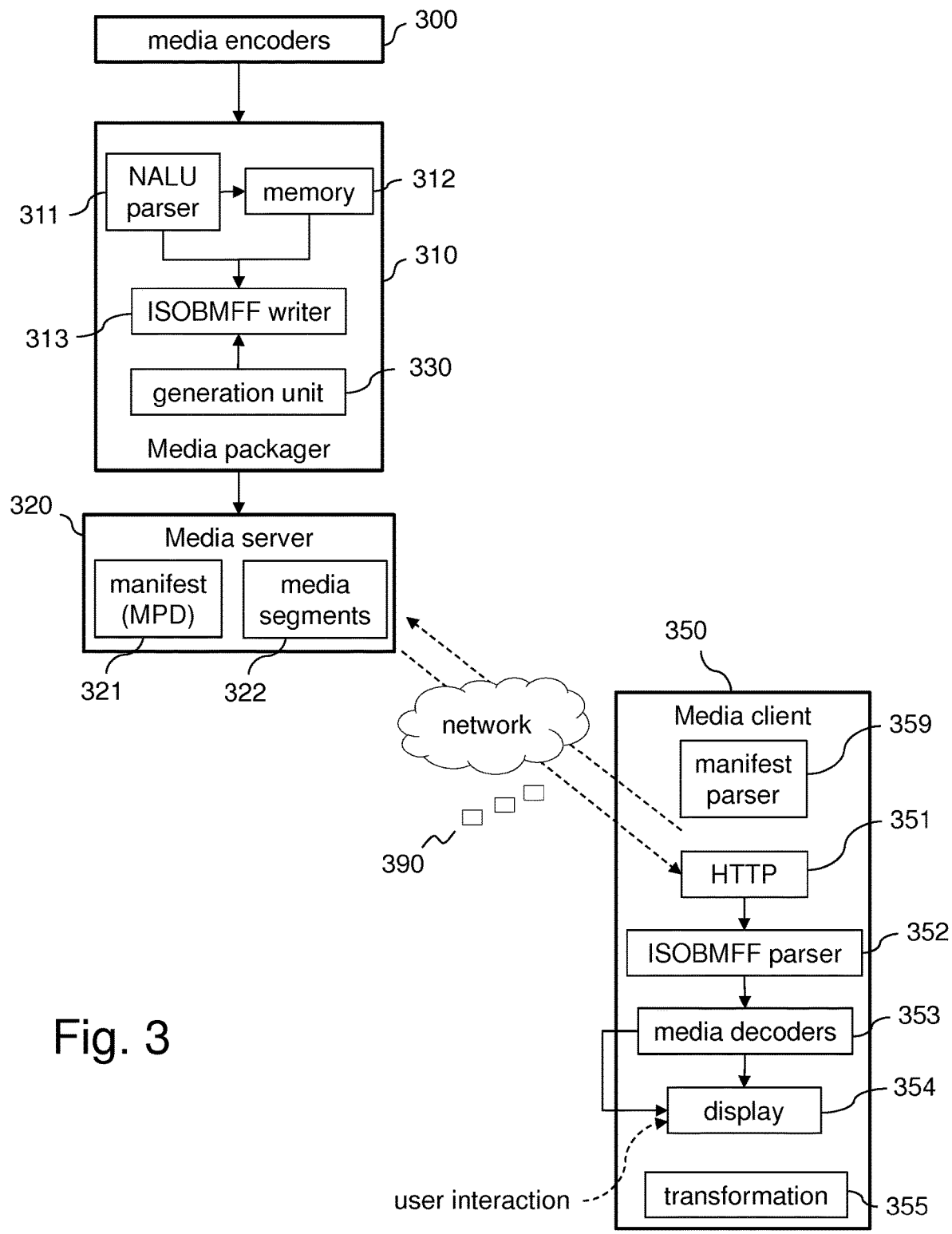
FIG. 3 illustrates an example of a client-server system wherein embodiments of the invention may be implemented.

FIG. 3 illustrates an example of a client-server system wherein embodiments of the invention may be implemented. It is to be noted that the implementation of the invention is not limited to such a system as it may concern the generation of media files that may be distributed in any way, not only by streaming over a communication network but also for local storage and rendering by a media player.

As illustrated, the system comprises, at the server's end, media encoders 300, in particular a video encoder, a media packager 310 to encapsulate data, and a media server 320. According to the illustrated example, media packager 310 comprises a NALU (NAL Unit) parser 311, a memory 312, and an ISOBMFF writer 313. It is to be noted that the media packager 310 may use a file format other than ISOBMFF. The media server 320 can generate a manifest file (also known as a media presentation description (MPD) file)) 321 and media segments 322.

A the client's end, the system further comprises media client 350 having ISOMBFF parser 352, media decoders 353, in particular a video decoder, a display 354, and an HTTP client 351 that supports adaptive HTTP streaming, in particular parsing of streaming manifest, denoted 359, to control the streaming of media segments 390. According to the illustrated example, media client 350 further contains transformation module 355 which is a module capable of performing operations on encoded bit-streams (e.g. concatenation) and/or decoded picture (e.g. post-filtering, cropping, etc.).

Typically, media client 350 requests manifest file 321 in order to get the description of the different media representations available on media server 320, that compose a media presentation. In response to receiving the manifest file, media client 350 requests the media segments (denoted 322) it is interested in. These requests are made via HTTP module 351. The received media segments are then parsed by ISOBMFF parser 352, decoded by video decoder 353, and optionally transformed in transformation unit 355, to be played on display 354.

A video sequence is typically encoded by a video encoder of media 300, for example a video encoder of the H.264/AVC or H.265/HEVC type. The resulting bit-stream is encapsulated into one or several files by media packager 310 and the generated files are made available to clients by media server 320.

According to embodiments of the invention, the system further comprises a generation unit 330 that may be part of the media packager or not. The generation unit makes it possible for a user to watch the encapsulated media tracks and to edit them so as to modify them by applying various image operations to the samples. To that end, the generation unit interacts with the media packager when the user wishes to insert the result of his composition as an additional track or as an edited track in the media file produced by ISOBMFF Writer 313. Typically, the additional track, derived or composed from other source tracks, may have lower priority than the source tracks. Indeed, if the source track is not received, the player will not be able to reconstruct, compose, or derive the additional track.

Still according to embodiments, the generation unit may be used to create a priority map. Moreover, the generation unit may add a priority map into a media file. In such a case, generation unit 330 may be considered as a priority map generator.

It is to be noted that the media server is optional in the sense that embodiments of the invention mainly deal with the description of encapsulated media files in order to provide information about data significance of encapsulated media data of the encapsulated media file, so that the encapsulated media data may be handled appropriately when they are transmitted and/or when they are received. As for the media server, the transmission part (HTTP module and manifest parser) is optional in the sense that embodiments of the invention also apply for a media client consisting of a simple media player to which the encapsulated media file with its description is provided for rendering. The media file can be provided by full download, by progressive download, by adaptive streaming or just by reading the media file on a disk or from a memory.

Figure 11:
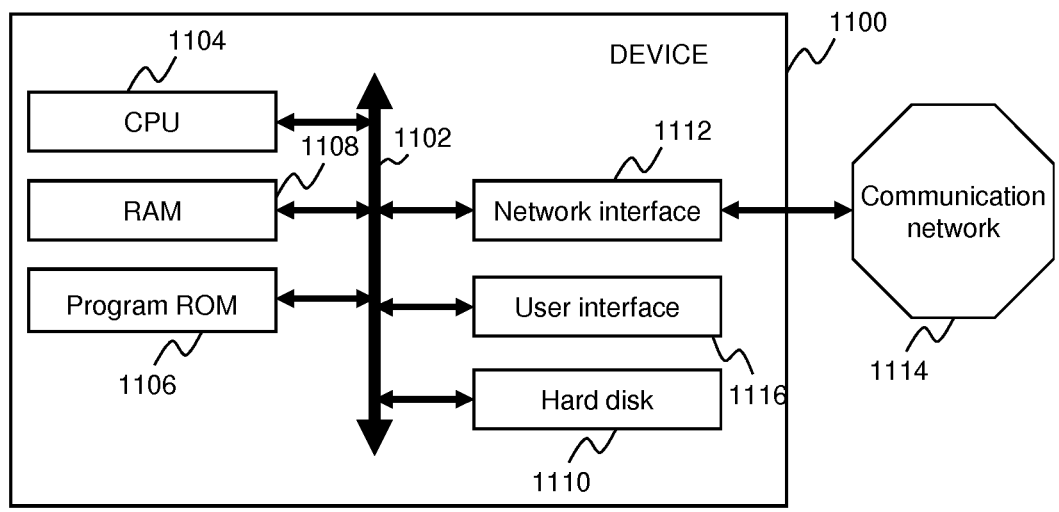
FIG. 11 schematically illustrates a processing device configured to implement at least one embodiment of the present invention.

According to embodiments, construction of priority maps can be done by a media packager such as media packager module 310 in FIG. 3 and more specifically by ISOBMFF writer module 313 in cooperation with generation unit 330, comprising software code, when executed by a microprocessor such as CPU 1104 of the server apparatus illustrated in FIG. 11.

Typically, the encapsulation module is in charge of reading high-level syntax of encoded timed media data bit-stream, e.g. composed of compressed video, audio or metadata, to extract and identify the different elementary units of the bit-stream (e.g. NALUs from a video bit-stream) and organize encoded data in an ISOBMFF file or ISOBMFF segments 322 containing the encoded video bit-stream as one or more tracks with descriptive metadata according to the ISOBMFF box hierarchy. Another example of encapsulation format can be the Partial File Format as defined in ISO/IEC 23001-14. In the meantime, it can store the byte ranges and assign processing levels or priorities.

According to particular embodiments, encoded timed media data bit-streams are encapsulated into a file, a fragmented file or into small temporal segment files according to an encapsulation file format, for instance ISO Base Media File Format (ISO/IEC 14496-12 and ISO/IEC 14496-15), Omnidirectional MediA Format (OMAF) (ISO/IEC 23090-2) or associated specifications, or possibly with one or more still image bit-streams according to the Image File Format (ISO/IEC 23008-12) or Partial File Format (ISO/IEC 23001-14) as defined by the MPEG standardization organization.

As described above, the processing levels or priorities may be indicated in an encapsulated media data file or in a companion file, as a "priority map". The "priority map" is a piece of information (e.g. a data structure) that gives information about the significance of encapsulated data so that these encapsulated data may be handled appropriately, it being observed that a media segment streamed with adaptive HTTP streaming (i.e. encapsulated data) is a mix of media data and descriptive metadata (for example a combination of 'moof'+'mdat').

According to particular embodiments, any discardable or priority information present in the media file, for example the relative importance of certain media samples signaled in a media component complying with ISOBMFF, may be used for building the priority map. For the sake of illustration, it is recalled here that ISOBMFF provides a specific type of sample group called 'RateShareGroup' that allows players or streaming servers to allocate bitrates when several streams (e.g. an audio stream and a video stream) share the same bandwidth resource. This provides relative importance between the streams (but it does not indicate that some media data could be lost without compromising the decoding and display of next samples). Still in ISOBMFF, the degradation priority box provides some degradation priority for each sample of each media component (e.g. an audio or a video sample). Likewise, the 'SubSampleInformationBox' provides priorities for sub-samples, i.e. at a finer level than sample and information on whether the sub-sample can be discarded without compromising the decoding of the current sample or not. However, it is observed that reaching this information is format specific and requires deep parsing of the media file and thus, it cannot be exploited at transport abstraction layer for example to decide on relative importance of transport packets. Moreover, it describes properties for an elementary stream (e.g. an HEVC bit-stream) and not for encapsulated data. Therefore, if there is no indication on the importance of the descriptive metadata brought by the file format level, these items of information can be used to build a priority map.

Accordingly, and for the sake of illustration, a priority map generator of a media packager may take as input an ISOBMFF media file having priority items of information on the samples or sub-samples, may read these items of information, may obtain the corresponding byte ranges, and may build a priority map by listing the pairs of priorities and corresponding byte ranges. Such a priority map may be expressed, for example using the Java Script Object Notation (JSON, Java and JSON are trademarks), as follows:

```
{
    "source" : "http://server.com/media/the_media_file.mp4",
    {"map": [
        { "range" : "0-10", "priority" : "high" },
        { "range" : "11-23", "priority" : "mid" },
```

-continued

```
        { "range" : "24-100", "priority" : "low" }
        ]
    }
}
```

According to this example, the source is indicated by a URL (http://server.com/median/the_media_file.mp4). However, it is to be noted that it could be indicated differently, for example by using a unique identifier of the media file. The byte ranges are expressed as in the 'Range' HTTP header, i.e. as first-last bytes included.

According to another example, the priority map could be described as a list of consecutive maps, each providing a start offset (start_offset) and a list of relative offsets with respect to this start offset with the corresponding priorities, as follows:

```
{
    "source" : "http://server.com/media/the_media_file.mp4",
    { "mapList": [
        { "start_offset": 0,
        [
            { "range" : "0-10", "priority" : "high" },
            { "range" : "11-23", "priority" : "mid" },
            ....
            { "range" : "123456-789101", "priority" : "high" },
        ],
        },
        { "start_offset": 789101,
        [
            { "range" : "0-40", "priority" : "high" },
            { "range" : "41-3214", "priority" : "mid" },
            ....
            { "range": "222345-3245680", "priority" : "high" },
        ]
        }
        ]
    }
}
```

In such a case, an HTTP client willing to address the second byte range in the second map would have to add the start offset (start_offset) to both first byte and last byte values, i.e Range: bytes=789142-792315.

From the above example, it can be seen that no specific knowledge of the encapsulation format or structure is required to parse and use the priority map. Indeed, indicating processing levels or priorities per byte range makes it possible to process an encapsulated media data file without knowing its format, for example to determine whether or not a received encapsulated media data file can be decoded or to send a decodable encapsulated media data file, whatever the container/encapsulation format in use (e.g. ISOBMFF, WebM, or Matroska).

It is to be noted that the priority map may not exhaustively cover the file in terms of byte ranges. In such a case, the non-covered byte ranges can be considered as having the lowest priority. This makes it possible, for example, to write shorter priority maps to describe the essential part of media files, for example to indicate the minimum metadata and media data to extract, fetch, or download in order to provide a decodable and displayable version of the media file.

Alternatively, a priority map may comprise an indication of the encapsulation format that is used. It may be added as an item of information in the companion file declaring the priority map. For example, the companion file may contain the following JSON line after the line defining the source (the MIME sub-types are provided as example, registered sub-types are recommended when defined):
"MIME_type": "video/mp4"
in order to indicate priorities of byte ranges for an ISOBMFF structured media file or
"MIME_type": "video/webm"
for a WebM structured media file, or
"MIME_type": "image/hif"
for a HEIF media file containing still images, or
"MIME_type": "video/paif"
for a media file structured according to Partial File Format (ISO/IEC 23001-14).

To indicate the encapsulation format and the unit of the ranges associated with the processing levels or priority values, a specific parameter can be defined in the priority map, for example, just after the "source" parameter. Still for the sake of illustration, this parameter can be called "mode" and take, as value, one of the following values: 'ISOBMFF_chunks', 'ISOBMFF_box', 'ISOBMFF_fragments', 'ISOBMFF_samples', 'ISOBMFF_sub_samples', 'ISOBMFF_NAL', or 'ISOBMFF_byte_ranges'. This indicates to the used priority map processor (for example a priority map writer or reader as illustrated in FIG. 7, 8, 9, or 10) whether the processing levels or priority values declared in the priority map apply to chunks defined in the ISOBMFF's Sample to chunk boxes, to the ISOBMFF boxes, to the fragments starting with an ISOBMFF 'moof' box, to the samples of the media file, to the sub-samples of the media file, to NAL units of the bit-stream, or to byte ranges (default unit). The authorized values for this "mode" parameter may be defined in a standard such as Codec Independent Code Points (ISO/IEC 23091) or in a registration authority such as "mp4ra", the MPEG-4 Registration Authority.

According to other embodiments, priority maps are embedded within the media files themselves. Such self-contained media files may provide some advantages, for example when the priority maps need to be transmitted to clients. According to particular embodiments, a priority map can be embedded at the beginning of a media file so that it can be rapidly extracted. Such a priority map may be called a "global priority map". It can be convenient when the data to encapsulate are fully available before priority map computation. Moreover, having the priority map at top level makes it possible for the index to start from one of the top-levels of the file: for example from the 'moov' box or from the top-level 'meta' box of an ISOBMFF file. Having a global priority map makes it possible to exchange the priority map as part of initialization data for media players or streaming clients.

Figure 4:
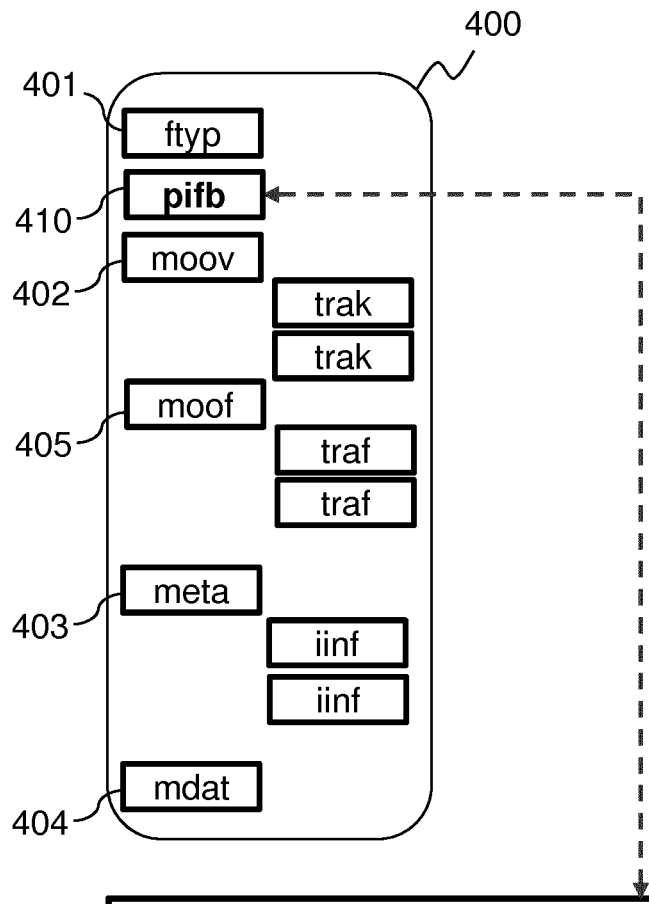
FIG. 4 illustrates an example of a priority map defined in a new box of an ISOBMFF structure.

FIG. 4 illustrates an example of a priority map (here "global") defined in a new box 410 right after the 'ftyp' box 401 in an ISOBMFF structure 400. According to this example, new box 410 precedes any other top-level box such as 'moov' box 402, 'meta' box 403, and 'mdat' box 404. It could also be included in the existing 'ProgressiveDownloadInfoBox' ('pdin') or any box dedicated to describing the organization and content of the media file.

An example of definition of 'pifb' box 410 is illustrated below ISOBMFF structure 400.

In this embodiment, the priority map is defined in a box called 'PriorityInfoBox' to which corresponds a reserved four-character code for identification by ISOBMFF parsers, for example 'pifb'.

As illustrated, this box provides a first parameter denoted "entry_count" indicating the number of listed pairs of processing level or priority and byte range declared in the box.

According to the given example, three parameter values are defined for each entry pair: the parameter denoted byte_range_start provides the position of the first byte in the current byte range, the parameter denoted byte_range_length provides the number of bytes in the current byte range, and the parameter denoted priority_level provides the assigned processing level or priority for the current byte range.

The flags parameter of box 410 indicating the processing levels or priorities can be used to indicate the level of details on the byte ranges. For example, the following flag values can be defined:
Prio_for_data_only: indicates that the byte range in priority info box 410 only concern byte ranges from the 'mdat' box,
Prio_for_moov_only: indicates that the byte range in priority info box 410 only concern byte ranges from the 'moov' and 'mdat' boxes, i.e. the byte ranges in the 'meta' box at top-level would not be described. This can be the case for a media file without any media item for example such as image items,
Prio_for_meta_only: indicates that the byte range in the priority info box 410 only concern byte ranges from the top-level 'meta' box and its sub boxes, i.e. the byte ranges deal with media items like for example image items,
Prio_at track level: the granularity of the priorities is given at track level, i.e. they make it possible to express relative priorities between tracks,
Prio_at_moof_level: the granularity of the priorities is given at fragment level (moof+mdat),
Prio at sample_group_level: the granularity of the priorities is given at sample group level,
Prio at sample_level: the granularity of the priorities is not finer than sample level, and
Prio at subsample_level: the granularity of the processing levels or priorities is at sub-sample level, i.e. there can be more than one byte range—processing level or priority pair for a given sample. For example, the processing level or priority could be expressed at NALU level. In particular, when the priority map generator relies on ISOBMFF structures to put processing levels or priorities (RateShareGroup, DegradationPriorityEntry, or SubSampleInformation box), it can set the flags value according to the appropriate level of description.

According to particular embodiments, the generation unit can generate a NALU-based priority map. It may consist in a list of pairs of NALU indexes and priority levels, the NALU indexes being given, for example, by the NALU order in the bit-stream. This NALU-based priority map could be stored within the bit-stream, for example as a supplemental enhancement information (SEI) message. For storage efficiency, it can be run-length encoded to have one processing level or priority value encoded for a run of NAL units with the same assigned processing level or priority. Storing a NALU-based priority map can be useful if the bit-stream is shared and later encapsulated in a different way than for the on-going live session. Moreover, this NALU-based priority map could be directly embedded in the File Format as a specific grouping_type for NALU mapping. Indeed, a NALUMapEntry 'nalm' could be defined with a sample to group box 'sbgp' having a grouping type set to 'nalm' and a grouping type parameter set to a specific reserved code to indicate priority level, for example 'prio' or 'pmap' for "priority map".

According to such embodiments, a SampleGroupDescriptionBox 'sgpd' with grouping_type equal to the specific reserved code 'prio' or 'pmap' lists specific PrioritySample- GroupEntry, inheriting from the abstract SampleGroupEntry and providing the processing level or priority value. This pre-computed priority map at NALU level could be reused to build the priority map for the encapsulated media file or media fragments as sub-sample information or some sample group information can be reused in this way. While the mapping of a priority map from the bit-stream to a NALU-MapEntry is quite direct (no byte ranges are specified, only a mapping between NALU-id and a priority level), the translation into (byte-range, priority level) pairs in the encapsulated file requires computation (each pair of (NALU_id, priority level) has to be converted into a pair of (byte-range, priority level)).

The ISOBMFF writer denoted 313 in FIG. 3 may encapsulate NAL units corresponding to an access unit into an ISOBMFF sample. The byte offset to the sample is then available. If all the NAL units forming an ISOBMFF sample have the same processing level or priority value, then a byte range for the whole sample can be stored with the NALU's processing level or priority value in the priority map for the media file or fragment. If the NAL units forming an ISOBMFF sample do not have the same processing levels or priority values, then several byte ranges may be stored, each with the corresponding NALU's processing level or priority value, in the priority map for the media file or fragment. When the priority map is built from a NALU-based priority map declared in a NALUMapEntry, the ISOBMFF stores the content of the NALUMapEntry and associated SampleToGroupBox with grouping_type equal to 'nalm' and SampleToGroupDescriptionBox 'prio' or 'pmap' in memory and removes it from the media file since redundant with the priority map. The priority map then uses the processing levels or priority values copied in memory and can compute appropriate byte positions in the encapsulated file. Indeed, removing the NALUMapEntry and associated SampleToGroupBox with grouping_type equal to 'nalm' and SampleToGroupDescriptionBox 'prio' or 'pmap' after the priority map computation would change the byte positions. These boxes can be preserved if the priority map is not embedded in the encapsulated media file or fragment.

When the data to encapsulate are not fully available before priority map computation, for example in live encoding/packaging for live or low-latency streaming, a "local priority map" is preferred. The low latency streaming is for example the low-latency DASH delivery mode as described in section 5.6 of ISO/IEC 23009-3: "Information technology—Dynamic adaptive streaming over HTTP (DASH)—Part 3: Implementation guidelines". In opposition to the "global priority map", one or more "local priority map" are defined to describe the media file in terms of processing levels or priority values.

The "local priority maps", when embedded in a media file, are not located at top level of the file, because byte ranges cannot be computed for the whole media file. Instead, they are embedded deeper in the file, for example at segment or fragment level. For example, in ISOBMFF, a "local priority map" can be defined per Movie Fragment 'moof' box or in the 'styp' box for a segment. The byte ranges are respectively movie-fragment or segment relative, meaning that the position zero of the byte range respectively corresponds to the first byte of the movie fragment or segment. The information provided by the priority map then corresponds to the Movie Fragment or segment.

The concatenation of the local priority maps into a global priority map, once whole file is available, is possible. In such a case, the resulting global priority map may have the flag parameters in its container box (for example 'pifb' 410) set to Prio_at_moof_level, indicating that the granularity of the processing levels or priorities is given at fragment level (moof+mdat). The local priority maps may be exchanged from a server to a client as fragment metadata, providing additional descriptive information for the movie fragments than the existing ISOBMFF boxes describing fragments (e.g. movie fragment header box 'mfhd', track fragment 'traf', or track fragment header 'tfhd' boxes).

According to particular embodiments, priority maps are stored in a media file according to Partial File Format.

The Partial File Format defined as ISO/IEC 23001-14 is related to ISOBMFF or DASH. It is a generic format used for describing files partially received over lossy communication channels. This format stores partial media data as a list of temporal segments, called "partial segments". A partial segment contains either the correctly received data or corrupted or missing blocks of data. The partial file storage, and the partial segment may provide identification, and repair information such as location of the file or high-level original indexing information for corrupted or missing blocks of data. This standard may help media players to process corrupted files by offering resynchronization points.

Figure 5A:
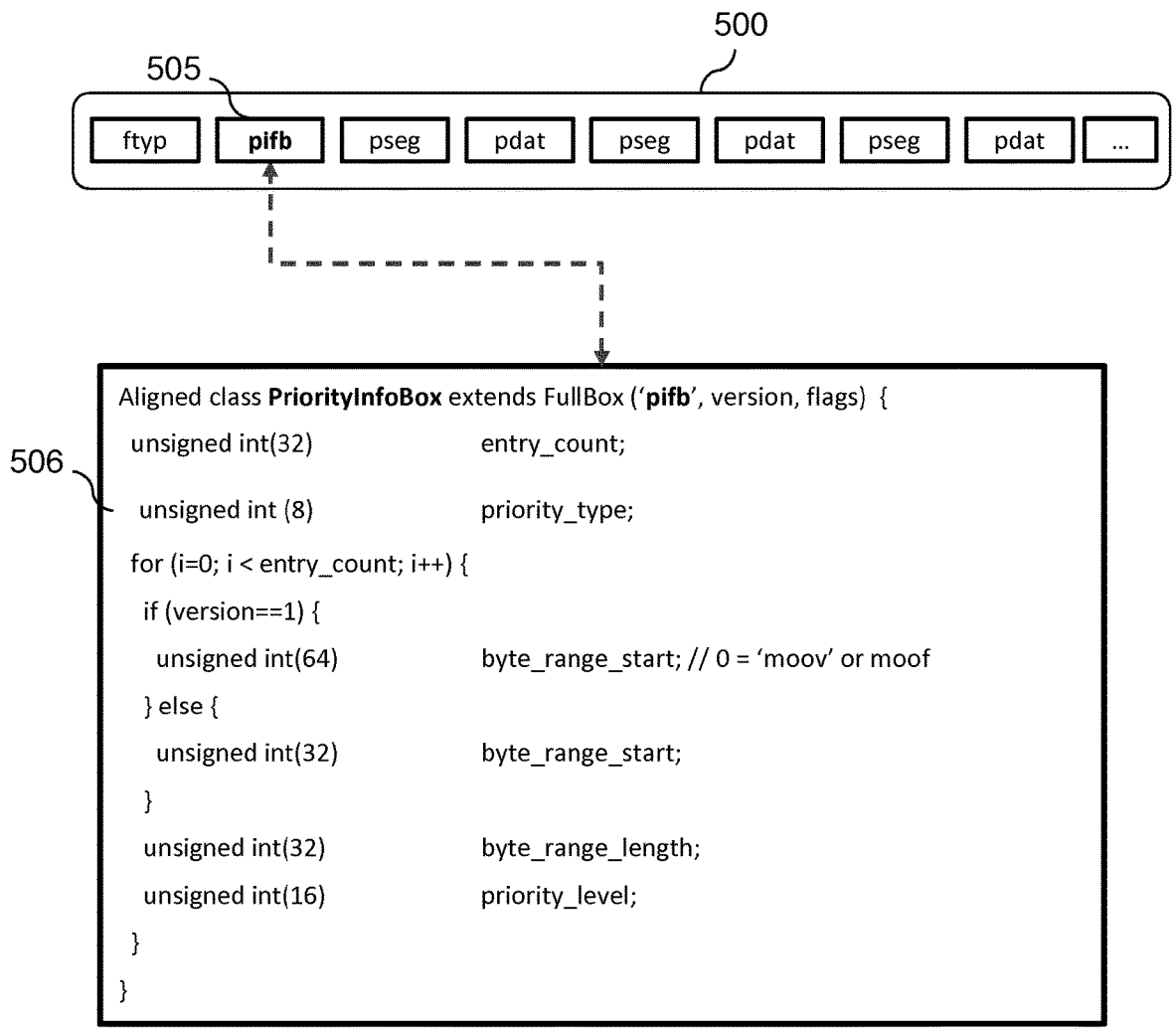
FIGS. 5a and 5b, illustrates embodiments according to which a priority map is stored in a media file according to Partial File Format.
Figure 5B:
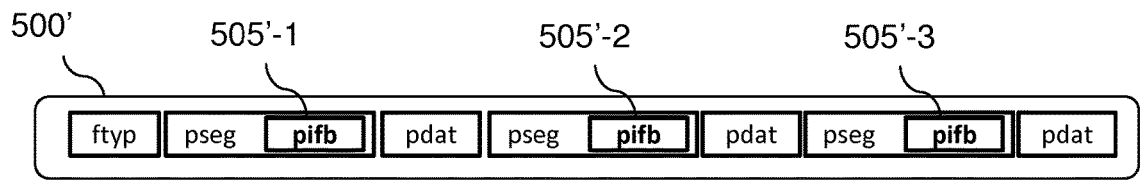

FIG. 5, comprising FIGS. 5a and 5b, illustrates embodiments according to which a priority map is stored in a media file according to Partial File Format. To that end, a new box that may be called, for example, "ByteRangePriorityInformationBox" or "PriorityInfoBox" is created, to which corresponds a reserved four-character code for identification by ISOBMFF parsers, for example 'brpi' or 'pifb', respectively. The "ByteRangePriorityInfoBox" or "PriorityInfoBox" box may comprise information to indicate transmission priority levels of byte ranges in the source file. This allows a media file reader to further optimize its repair process, or allows a server to optimize its distribution (for example its retransmission policies or the use of a forward error correction (FEC)).

For the sake of illustration, priority map 505 in FIG. 5a is global to the media file 500 whereas priority maps 505'-1, 505'-2, and 505'-1 in FIG. 5b are local to each partial segment of the media file 500'.

As illustrated in FIG. 5a, 'pifb' box 505 may be located at the top-level of the partial file, for example right after the 'ftyp' box. Alternatively, it may be located within the 'PartialFileHeaderBox'. 'pifb' box 505 indicates the byte range priorities for the complete file using absolute offsets. No other "ByteRangePriorityInfoBox" or "PriorityInfoBox" shall be present in any subsequent PartialSegmentBox 'pseg'.

Conversely, as illustrated in FIG. 5b, 'pifb' box 505'-1 to 505'-3 providing priority maps are directly under the 'pseg' box of the partial segments or in the partial segment header ('pshd'). In such a case (according to which the 'pifb boxes are stored in a 'pseg' or 'pshd' box), the byte offsets are relative offsets to the partial segment itself. The "ByteRangePriorityInfoBox" or "PriorityInfoBox" contains a parameter to define the type of indexing (global to the file or relative to a current segment). This parameter can be for example the "flags" parameter of the FuBox. It can also be implicit depending on where the box is declared (top-level of the file or in a partial segment). In a particular embodiment, an explicit signaling within the "flags" parameter of the box can be used.

For the sake of illustration, the relative_offset flags can be defined as follows for the "ByteRangePriorityInfoBox" or "PriorityInfoBox": its value is set to 0x000001 to indicate that indicated byte ranges are relative to the first byte of the first chunk of the partial segment containing this box and the absence of this flag indicates that the byte ranges are relative to the beginning (first byte) of the source file. This flag shall not be set if the container box is a PartialFileHeaderBox.

The box may be defined as follows using, as example, the name "ByteRangePriorityInfoBox" and the four-character code 'brpi':
Box Type: 'brpi'
Container: PartialSegmentBox or PartialFileHeaderBox
Mandatory: No
Quantity: At most one per PartialSegmentBox, or one in PartialFileHeaderBox using the following syntax:

```
aligned(8) class ByteRangePriorityInfoBox extends
FullBox('brti', version, flags) {
    unsigned int(32)entry_count;
    for (i=0; i < entry_count; i++) {
        if (version==1) {
            unsigned int(64)byte_range_start;
        } else {
            unsigned int(32)byte_range_start;
        }
        unsigned int(32)byte_range_length;
        unsigned int(16)priority_level;
    }
}
``` with the following semantics:
entry_count is the number of index points listed in this box,
byte_range_start specifies the start of the byte range of the index in the source file (if version 1 is used, 64 bit data offsets are used, otherwise 32 bit data offsets are used),
byte_range_length specifies the size in bytes of the byte range, and
priority_level specifies the priority level of that byte range (a value of 0 indicates the highest priority). Repair or sending operations can be prioritized based on this value.

When a client has knowledge about a priority map and decides to store the media file as a partial file, it can also store the priority map along with the media data. A client having information on dependency of byte ranges on a partial file may optimize its recovery or parsing of that file by repairing only a given set of bytes. A client can therefore identify the parts it wants to recover first, and potentially further mark as lost all ranges with lowest priority if unable to recover them.

According to particular embodiments, the priority map may further provide additional items of information such as annotations or description information, in addition to the pair of byte ranges and priorities. For example, the priority map may provide for some byte ranges whether the byte ranges correspond to media data only, to metadata only, or is a mix of both. According to these embodiments, the priority levels may be associated with any byte ranges or with byte ranges corresponding to specific structures in the file format. For example in ISOBMFF, the byte range can correspond to a sub-sample, a sample, a chunk, a fragment, or a box. By default or when such additional items of information are not present, the unit processing the priority map considers a byte range without any specific associated semantic.

Media files encapsulated according to the Partial File Format, the ISOBMFF, or the HEIF/MIAF format may contain a BoxFileIndexBox 'fidx' global to the file or local to a fragment (for ISOBMFF or 'pict' track) or to a partial segment 'pseg' (in case of Partial File Format). This BoxFileIndexBox 'fidx' provides a summary of the box hierarchy of the complete source file. It contains a list of indexed boxes, each described in a BoxIndexBox 'bodx'.

According to embodiments for structured priority maps, this index box is the container for the priority map. For example, the priority map 'pifb' box referenced 410 in FIG. 4 is inserted, stored, or declared as the first box of the 'fidx' box of an ISOBMFF or HEIF/MIAF file. As another example, the priority map 'pifb' box referenced 505 in FIG. 5 is inserted, stored, or declared as the first box before the list of BoxIndexBox in the 'fidx' box of a media file encapsulates into Partial File Format. A global 'fidx' box contains a global priority map. A global 'fidx' box may contain a list of local priority maps. Alternatively, instead of being contained in the 'fidx' level, the priority map is referenced as the other boxes of the media file. This means that the priority map appears in the 'fidx' in the order it is declared in the media file in the list of boxes declared under the 'fidx' box. A global 'fidx' box may reference one global priority map or a list of local priority maps.

Another embodiment for priority map description in the file index boxes like 'fidx' is to directly declare the processing level or priority value in each or in some BoxIndexBox 'bidx' declared in the 'fidx'. In the case according to which all the box contents (byte-range corresponding to the box) have the same processing level or priority level, it can be indicated as follows:

```
aligned(8) class BoxIndexBox extends Box('bidx') {
    unsigned int(32) indexed_box_size;
    unsigned int(32) indexed_box_type;
    unsigned int (8) indexed_box_priority;
    if (indexed_box_size==1) {
        unsigned int(64) indexed_box_largesize;
    } else if (indexed_box_size ==0) {
        // original box extends to end of original file
    }
    if (indexed_box_type=='uuid') {
        unsigned int(8) [16] indexed_box_usertype;
    }
    Box other_boxes[ ];   // to end of the box
}
```

When one box indexed in 'fidx' or 'bidx' has byte ranges with different processing levels or priority values, instead of a single processing level or priority value, the BoxIndexBox 'bidx' can contain a list of byte ranges (run-length encoded), each with a corresponding processing level or priority, as follows:

```
aligned(8) class BoxIndexBox extends Box('bidx') {
    unsigned int(32) indexed_box_size;
    unsigned int(32) indexed_box_type;
    unsigned int (8) nb_ranges;
    for (range=1; range <= nb_ranges; range++) {
        unsigned int(32) byte_length;
        unsigned int(16) priority_level;
    }
    if (indexed_box_size==1) {
        unsigned int(64) indexed_box_largesize;
    } else if (indexed_box_size ==0) {
        // original box extends to end of original file
    }
    if (indexed_box_type=='uuid') {
        unsigned int(8) [16] indexed_box_usertype;
    }
    Box other_boxes[ ];   // to end of the box
}
``` where
nb_ranges indicate the number of byte ranges for which a processing level or priority value is described in the box, byte_length indicates the number of bytes from the last byte of the previous byte range to which the priority_level is assigned. The first byte range starts from the first byte of the indexed box object of the BoxIndexBox 'bidx', and priority_level is the processing level or priority level associated to the current byte range. The nature or purpose (priority_type) of the processing level or priority may be defined as an optional parameter in the beginning of the 'fidx' box (for example before looping on indexed boxes). This extended BoxIndexBox is convenient to index data from the 'mdat' box.

When the priority map is contained in or used in conjunction with Partial File Format containing multiple sources (i.e. for example media tracks coming from different original media files), the priorities stored in a partial segment are relative for a given source. Optionally, for such configuration the (byte-range, priority) pair declared in the priority map contains the additional parameter source_id, so that each byte range can directly be associated with a source URL (in case there is not systematically one sourceURL present in each partialSegment). To avoid repeating the source_id in the priority map, one segmentURL 'surl' may be declared per partial segment 'pseg' as soon as the partial file contains an index at partial segment level and this whatever the index: BoxIndexBox or a priority map like the 'brti' box according to embodiments of the invention.

According to particular embodiments, a priority map is referenced from a media file (e.g. ISOBMFF, Partial File Format, HEIF or MIAF) instead of being included in the media file. For the sake of illustration, a PriorityURLBox 'pubx' (the name and code are only given as examples) may be defined to be placed at the top level of the file. The box may be placed right after the 'ftyp' box to be rapidly parsed by players. The box may be placed in the box dedicated progressive information, for example 'pdin' or some file index box like 'fidx'. The PriorityURLBox contains a URL pointing to a resource containing the declaration of the priority map according to embodiments of the invention:

```
aligned(8) class PriorityURLBox extends FullBox('pubx', 0, 0) {
    string url;
    string mime;
}
``` with the following semantics:

url is a NULL-terminated C string encoded in UTF-8; the last NULL character shall be set even if the URL is empty. The URL specifies a source URL for the file containing the declaration of a priority map for the media file, and mime is an optional NULL-terminated C string encoded in UTF-8; the last NULL character shall be set even if the mime is empty. It specifies the mime type associated with the file at the given URL, for example: application/json when the priority map is agnostic to the encapsulation format.

In alternative embodiments, the URL to the resource declaring the priority map, for referencing the priority map from the media file, when encapsulated in Partial File Format, is directly put as an additional optional parameter of the sourceURL:

```
aligned(8) class SourceURLBox extends FullBox('surl', 0, 0) {
    string url;
    string mime;
    string p__url;
}
``` where the semantics for the "url" and "mime" parameters are the same as for sourceURLBox and the new parameter "p_url" is a NULL-terminated C string encoded in UTF-8; the last NULL character shall be set even if the URL is empty. The URL specifies a source URL for the file containing the declaration of a priority map for the media file. To preserve backward compatibility with SourceURLBox, this parameter may be defined in a new version (e.g. version=1) of the SourceURLBox as follows:

```
aligned(8) class SourceURLBox extends FullBox('surl', version=1, 0) {
    string url;
    string mime;
    if (version ==1) {
        string p__url;
    }
}
``` with the same semantics as in the above embodiments for SourceURLBox.

This makes it possible to reference one or more local priority maps from a given media file. A SourceURLBox with version=1 or with the additional p_url parameter defined under a PartialSegmentBox references a priority map local to the partial segment. A SourceURLBox with version=1 or with the additional p_url parameter defined under a PartialFileBox references a priority map global to the media file or one or more local priority maps relative to partial segments.

Whatever the storage format of the priority map, it may be useful to use it when preparing the media content for streaming. For example, when streaming data with DASH, priorities provided by a priority map may reflect alternative or discardable parts of a media file. A DASH packager, the module at server side preparing the content for streaming, may exploit the priority values to build and describe in the DASH manifest one Representation per priority level, thus offering adaptation possibilities for the streaming clients. Similarly to alternatives in terms of quality signaled with a specific attribute in the Representation element, these alternative Representations may be signaled in the MPD with a dedicated attribute, for example "priorityRanking" or "priorityLevel". The Representation with a value of priorityRanking equal to 0 is the one with highest priority while the Representation with the higher priorityRanking value has the lower priority. When the priority levels match the picture encoding mode (e.g. Intra, Predicted, Bi-directional), this is a convenient and direct means for a DASH packager to organize the media file and the manifest as follows, given the priority map below (assuming Intra pictures have high priority level, Predicted pictures have mid priority and Bi-directional images have low priority level).

A preliminary step to the streaming manifest generation consists for the DASH packager in reorganizing the media file so that samples with a same level of processing level or priority form a contiguous byte range in the media data box. This makes it possible to reduce the number of byte ranges from a complexity in number of samples to a complexity in number of processing levels or priorities. This data arrangement is also possible for example when some patterns can be determined in the media data, like frame coding types (I, P, B).

The reorganization of the data in the 'mdat' box and corresponding metadata boxes (SampleToChunkBox 'stsc', TrackRunBox 'trun') according to the processing levels or priority values provides new accesses in the media file: per level, rather than temporal. A specific brand for priority-based encapsulation may be defined and used as major_brand or in the list of compatible_brands in 'ftyp' box for parsers, media players, or streaming clients to exploit this specific organization: progressive rendering, progressive download, streaming, or packaging according to these priorities. Moreover, this data reorganization makes it possible to use efficient byte range requests to get data for a given priority level, which is relevant for adaptive streaming usage.

Likewise, when media fragments from ISOBMFF have the same fragment size in bytes (signaled in TrackExtendsBox 'trex' and the flags value default-sample-size-present not set in the Track Fragment Header Box 'tfhd'), the priority levels, when defined at the fragment granularity (i.e. mode=ISOBMFF_Fragments), may be defined as a list of consecutive priority values, one per fragment, in the fragment declaration order. The DASH Packager can use an alternative mode to the media data reorganization by creating a segment index box 'sidx'.

A priority map may contain a "mode" attribute to indicate the unit of the ranges. An additional optional parameter can indicate the purpose or the nature of the processing levels or priority values (e.g. priority_type 506). For example, the purpose or the nature of the priority map may correspond to operating points in the media file. For multiview video, the top priority may correspond to the default view, for example left view or the one indicated in a StereoVideoBox. Lower priorities may be given to the other view forming a stereo pair. Likewise, operating points may correspond to a combination of one or more layers in multi-layer video like SVC (Scalable Video Coding) or L-HEVC (Layered-High Efficiency Video Coding). High priority may be given to data corresponding to the base layer while data corresponding to enhancement layer may have lower priorities. For the sake of illustration, the priority map generator may exploit information given from OperatingPointInformation 'oinf' or Layer information 'linf' given in ISOBMFF when the video is encoded with L-HEVC. Another purpose of the priority map, and possible value for the priority_type 506, may be to qualify byte ranges with "reliable" or "unreliable" data, may be present as an optional parameter in the priority map, as shown with the "purpose" parameter below.

```
{
    "source" : "http://server.com/media/the_media_file.mp4",
    "mode" : "ISOBMFF_sample"
    "purpose": "operating_point"
    {"map": [
        { "range" : "0-12569", "priority" : "high" },
        { "range" : "12570-13580", "priority" : "high" },
        { "range" : "13581-13684", "priority" : "low" }
        { "range" : "13684-15223", "priority" : "mid" }
        { "range" : "15224-16112", "priority" : "low" }
        { "range" : "16113-18793", "priority" : "high" }
    ....
    ]
    }
}
<MPD... >
<Period>
    <BaseURL>http://example.com/theMovie.mp4 </BaseURL>
<AdaptationSet ... >
Representation id="1" priorityRanking="1" framerate="2">
... // URLs to byte range for high priority data
    <SegmentURL mediaRange = "0-13580" .../>
    <SegmentURL mediaRange = "15224-16112" .../>
... // list of segments corresponding to byte ranges with high priority
</Representation>
Representation id="2" priorityRanking="2" framerate="15">
... // URLs to byte range for high + mid priority data
    <SegmentURL mediaRange = "0-13580" .../>
    <SegmentURL mediaRange = "13684-15223" .../>
    <SegmentURL mediaRange = "15224-16112" .../>
    <SegmentURL mediaRange = "15224-16112" .../>
...
</Representation>
Representation id="3" priorityRanking="3" framerate="30">
... // URLs to byte range for high + mid + low priority levels
</Representation>
</AdaptationSet ... >
</Period>
</MPD>
```

Such a streaming manifest makes it possible for a streaming client to request one or another version of the same content in terms of relative priorities. This is a particular case of media presentation description with nested and alternative Representations. Optionally, the purpose or the nature of the priority ranking may also be present in the Representation or AdaptationSet as an attribute or descriptor. For example, at AdaptationSet level:

```
<AdaptationSet ...priority_type="operating_point"... > or
<AdaptationSet ...>
SupplementalProperty scheme_id_uri="urn:mpeg:dash:2018:priority" value
="operating_point" .../> ...,
or at Representation level:
Representation id="2" priorityRanking="reliable" priority_type="reliability" > or
Representation id="2" priorityRanking="reliable" >
<SupplementalProperty scheme_id_uri="urn:mpeg:dash:2018:priority"
value="reliability" ... />
``` corresponding for example, to complete vs. incomplete or corrupted data. The priority_type may be set to "reliability". This may be useful when the server streams data from a Partial File Format resource. This may also be useful when the media file contains indication on the completeness of the boxes or the samples (e.g. sample entry different than 'null', 'loss' or 'crpt'). The purpose or nature of the priority map to indicate in this example that the Representation contains complete and then reliable or safe (for the client's player) fragments or segments.

Alternatively, all the items of priority related information may be described in the SupplementalProperty descriptor (or EssentialProperty in some cases like unreliable or incomplete segments) as follows:

SupplementalProperty scheme_id_uri="urn:mpeg:dash:2018:priority" value="2, operating_point"/>.

In this example, the value attribute of the descriptor concatenates the priority ranking (the $2^{nd}$ operating point in the example) and optionally the priority type parameters (an operating point in the example). Another alternative can be the use of the Role element with a specific Role type dedicated to priority signaling.

FIG. 6, comprising FIGS. 6a to 6d, illustrates examples of use of a priority map in a server and/or in a client for streaming data from the server to the client, for example for streaming data from server 110 to client 100 in FIG. 1.

Figure 6A:
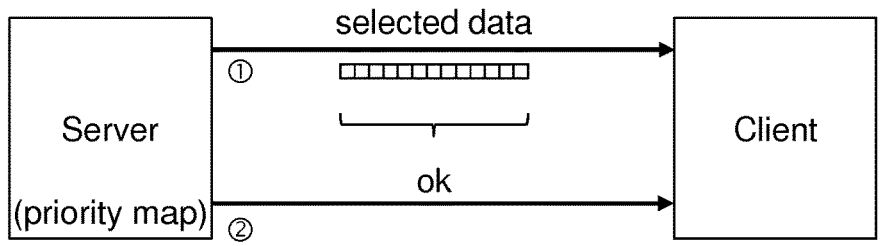
FIGS. 6a to 6d, illustrates examples of use of a priority map in a server and/or in a client for streaming data from the server to the client.

According to the example illustrated in FIG. 6a, the server uses a priority map associated with an encapsulated media data file to select data of the latter, for example to select data associated with a processing level (or priority level) indicating that these data may be processed at the client's end. After being selected, these data are sent to the client (①) with an item of information indicating that these data may be processed (②). Such an item of information may correspond to the known 200 OK response. In such a case, the priority map is known by the server and does not need to be known by the client (although it can be known by the client so that the latter may check the received data).

Figure 6B:
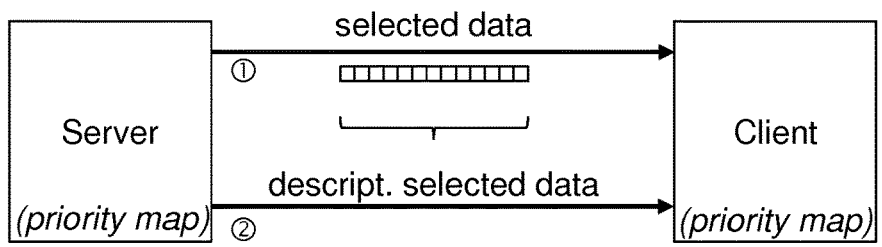

According to the example illustrated in FIG. 6b, the server uses a priority map associated with an encapsulated media data file to select data of the latter. After being selected, these data are sent to the client (①) with a description of these data (②). Such a description may comprise a definition of the byte-range of the selected data, for example a start position index and a length. It may correspond to the known 206 [a;b] response (HTTP response with a Content-Range header). According to embodiments, the selected data are data associated with a processing level (or priority level) indicating that these data may be processed at the client's end. For example, in case of Partial File Format transmission, it can indicate that the data are complete data (i.e. complete Partial Segments) that are safe for decoding (i.e. the purpose or nature of the priority map is "reliability"), meaning that there is a low risk for parser or decoder crash for example.

In such a case, the priority map is known by the server for selecting the data to be sent, or by the client for determining whether or not the received data can be processed, or by both the server and the client.

Figure 6C:
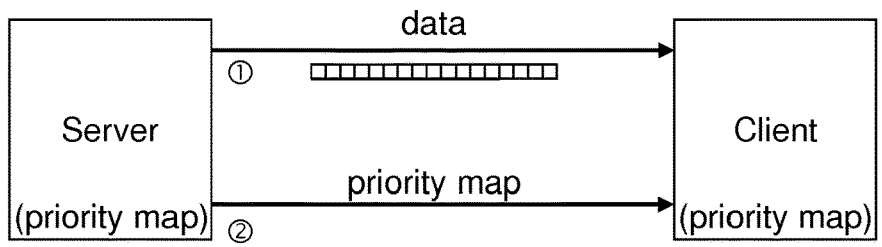

According to the example illustrated in FIG. 6c, the server selects data of an encapsulated media data file and obtains a priority map associated with these encapsulated media data file. The server sends the selected data (①) and the priority map (②), making it possible for the client receiving the data to determine whether or not the received data may be processed. In such a case, the priority map is known by both the server and the client. When the server is HTTP/2 server, the priority map can be a specific frame. When the server supports push, it can be pushed in addition to the media data.

Figure 6D:
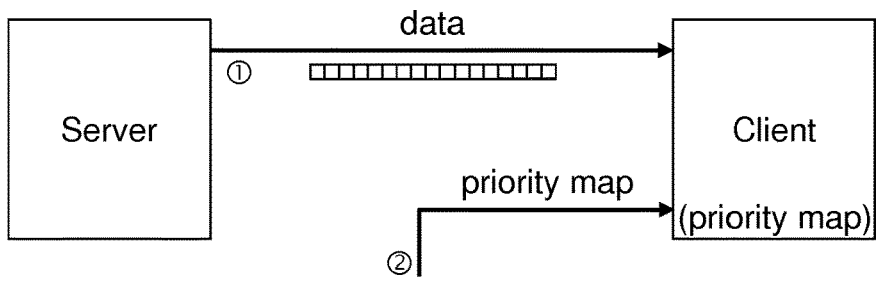

According to the example illustrated in FIG. 6d, the server selects data of an encapsulated media data file and sends the selected data (①). On its end, the client receives the selected data from the server and receives a priority map associated with the encapsulated media data file from another device (②)), making it possible for the client to determine whether or not the received data may be processed. In such a case, the priority map is known only by the client.

It is to be noted that the server's end modes, for example those described by reference to FIGS. 7 and 8, can be combined with the client's end modes, for example those described by reference to FIGS. 9 and 10. FIG. 6 illustrate these different combinations. If the server has a priority map available (FIG. 6a, 6b, or 6c), it can decide to send only some byte ranges for the requested media data given the priorities provided by the priority map. In the meantime, the client also having a priority map available (e.g. FIG. 6b, 6c, or 6d), may further adapt the transmission by cancelling some retransmission for some of the byte ranges selected by server that would not be top priority or under a selected processing level or priority value by the client. This selected processing level or priority value can of course vary along time depending on complexity of the sequence or on the network conditions for example.

The client may receive the priority map at session setup (FIG. 6b), during the transmission along or within media segments (FIG. 6c), or from another entity than the media server (FIG. 6d). Indeed, while FIG. 3 shows a server handling the encoding, encapsulation and priority map computation on a same device, there may be one or more server handling each or a subset of these steps. For example, a media server may handle the encoding and encapsulation. Another server, streaming server, may handle the packaging for streaming and the priority map computation.

The different combinations from FIG. 6 apply when the server sends ISOBMFF and the client stores received data in ISOBMFF or in Partial File Format. It also applies when the server sends Partial File Format data and the client stores the received data as ISOBMFF or in Partial File Format.

Figure 7:
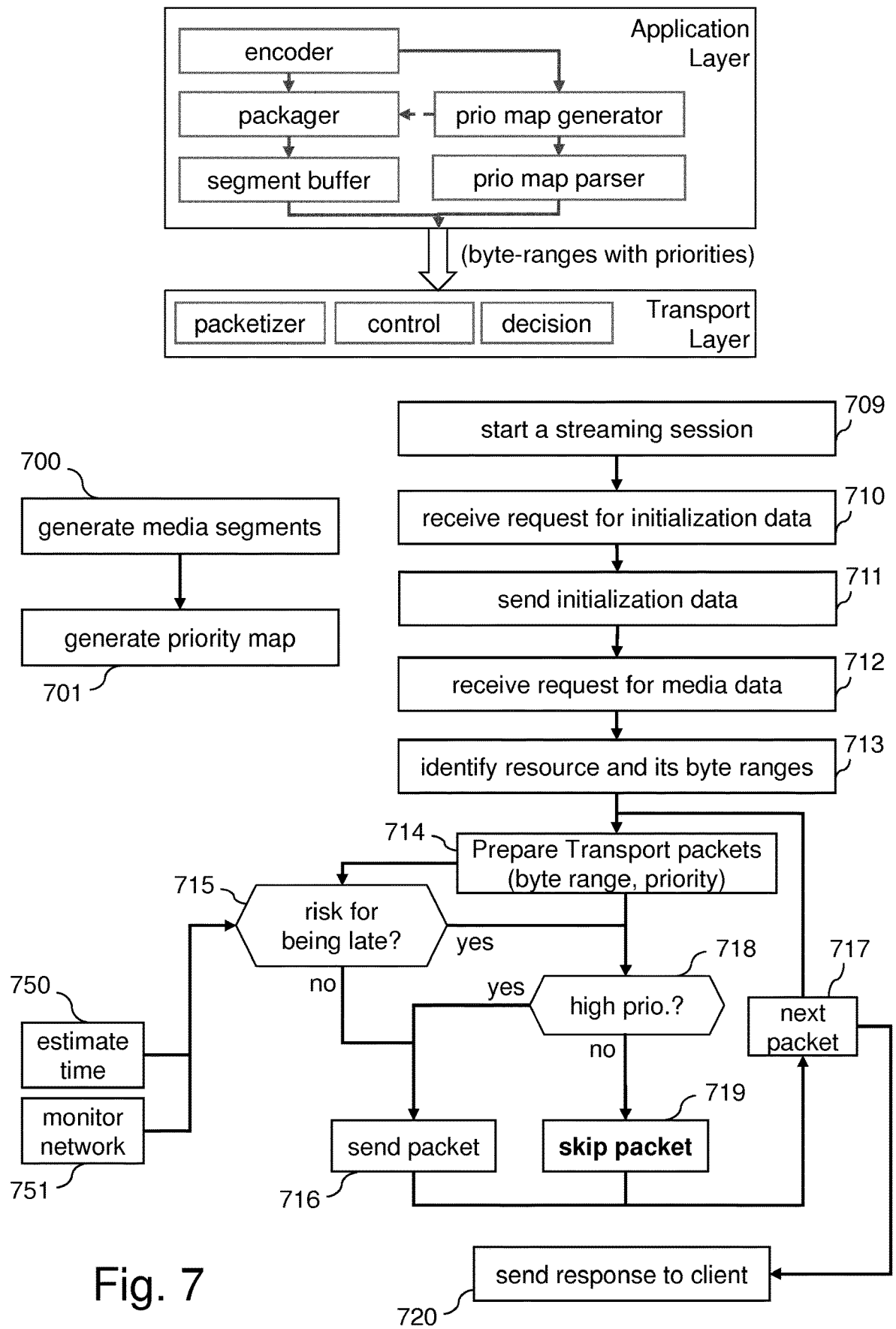
FIGS. 7 and 8 illustrate examples of use of a priority map in a media streaming scenario between a server and a client, at the server's end.

FIG. 7 illustrates a first example of use of a priority map, at a server's end, in a media streaming scenario between a server and a client, for example between server 110 and client 100 in FIG. 1. For the sake of illustration, it is assumed that the server implements the protocol stack illustrated in FIG. 2 and contains units or modules similar to units 300, 310, and 320 illustrated in FIG. 3 for media content generation and description, the description including the priority map according to embodiments of the invention.

According to this example, application layer 200 exploits the priority map created by generation unit 330 in order to control the sending rate of media data at the server's end. This may be convenient when the number of clients is not too high, because the server has to maintain some statistics on client connections.

As illustrated, the media server continuously generates media segments from recorded live content (step 700). For example, the server encodes video as HEVC or AVC bit-stream and then, encapsulates this bit-stream as ISOBMFF fragments. During encapsulation, the generation unit builds a priority map (step 701) for each encapsulated ISOBMFF fragment. For example, the boxes for the fragment structures are marked as high priority as well as the first random access sample of the fragment. Subsequent random access samples can be assigned a lower priority and samples corresponding to predicted frames are assigned an even lower priority. According to embodiments, the generation unit is coupled to the video encoder to get information on the generated NAL units (to obtain its type, to determine whether it corresponds to a slice, a tile, etc.). These generated media segments and the priority map are used when answering client requests.

After the server receives a request from a streaming client to start a streaming session, the client and the server negotiate a "close to live" transmission mode, meaning that the client is interested in low delay or low latency mode rather than highest quality (step 709). In other words, the client prefers experiencing some losses than display freeze, waiting for example for retransmission. This is for example done through a dedicated HTTP header indicating that the client accepts partial file format (i.e. incomplete or corrupted ISOBMFF files, fragments or segments) or runs in unreliable mode. Examples HTTP headers can be respectively:
accept: video/paif
unreliable: true It is to be noted that the client can indicate preference between the formats, for example:
accept: video/mp4 q=1.0, video/paff In such a case, the client indicates a preferred mode for complete ISOBMFF files, fragments or segments but indicates that it also handles partial ISOBMFF files, fragments or segments. In general, the server confirms which format it sends back to the client, for example using the "Content-Type" HTTP header with the appropriate value, depending on its strategy. The decision on which parts of the data to send, according to transmission context and to priorities declared in the priority map can be computed:
- fully at application layer, the application layer providing the selected byte ranges to the transport layer for actual transmission to the client;
- partially at application layer (as illustrated in FIG. 7), the application layer providing a decomposition of the requested segment as a list of byte-ranges with their priorities; or
- fully at transport layer (FIG. 8), the application layer providing the data and the priority map to the transport layer, the transport layer being in charge of filtering the data when needed with respect to their priorities declared in the priority map.

Turning back to FIG. 7, the server receives a request from the client for initialization data to actually start the streaming session with the negotiated mode and setup the media decoders (step 710. When streaming uses MPEG DASH, the initialization data may be an initialization segment, corresponding for example to the 'moov' box of the media file. Depending on where the priority map is stored (at top level in the media file or as a companion file), it may be part of the initialization data. The server replies (step 711) by sending an initialization segment. Next, the server receives requests from the client requesting media data, for example as HTTP requests for media segments or as HTTP requests with byte ranges (step 712).

According to the example illustrated in FIG. 7, the transmission is handled partially at the application layer. The priority map is computed during the encapsulation of the media file (step 701). The priority map may be embedded within the encapsulated media file for further use or may remain in the server's memory.

The requested segment (step 712) is identified by the application layer of the server as a list of byte ranges with associated priorities (step 713). The priorities are read from the generated priority map and then, the application layer provides data to the transport layer (for example the TAS layer) with their corresponding priorities.

The transport layer prepares transport packets (step 714). Depending on the transport protocol in use, this step may consist in the creation of a stream and of packets (packetization) or may simply consist in the creation of packets. For a requested segment, the transport layer monitors, throughout the session, the network characteristics for the client (steps 750 and 751), for example the round-trip time and the estimated bandwidth. This is used by the server to determine and to check, during step 715, whether the requested segment may be delayed or not. If there is no risk, for example because bandwidth is sufficient or round-trip time allows some packet retransmission, the server may decide to send all the data packets corresponding to the requested segment (step 716). On the contrary, if there is a risk that the requested segment may be delayed, the server checks the priority map (step 718) to determine whether some parts of the data may be skipped (i.e. byte ranges associated with lower priorities). If there exist byte-ranges in the segment that have low priorities, the server may decide to skip these byte ranges (step 719). This may limit the risk for loss in the network or delayed/late reception at client's end.

According to embodiments, when data are skipped, the transport layer informs the application layer and the server replies to the request received from the client (step 712) with a 200 OK response and a Content-Type indication "partial forma", for example "video/paff" (step 720). It is to be noted that using the 200 OK response results from the agreement between both client and server on a non-reliable mode and from the selection, by the server, of data that remain playable (thus sending a sub part of the requested resource that remains decodable and displayable at client's end).

In other embodiments, the data filtering step (steps 715 to 719) can be performed at the application layer. In such a case, the transport layer remains "standard" because the application layer provides only filtered data to send. The network and time monitoring is done at application layer. In these embodiments, step 713 is preferably followed by a decision step such as the one implemented in steps 715 and 718, to decide whether the application layer sends a byte range to the transport layer or decides to skip a byte range corresponding to the requested segment. The server replies to the client with a 200 OK response and indicates that partial content has been sent, for example using the Content-Type HTTP header with "video/paff" values. In these embodiments, there is no need for the transport layer to provide feedback to the application layer regarding complete or partial transmission since the data filtering or selection is done at the application layer.

Figure 8:
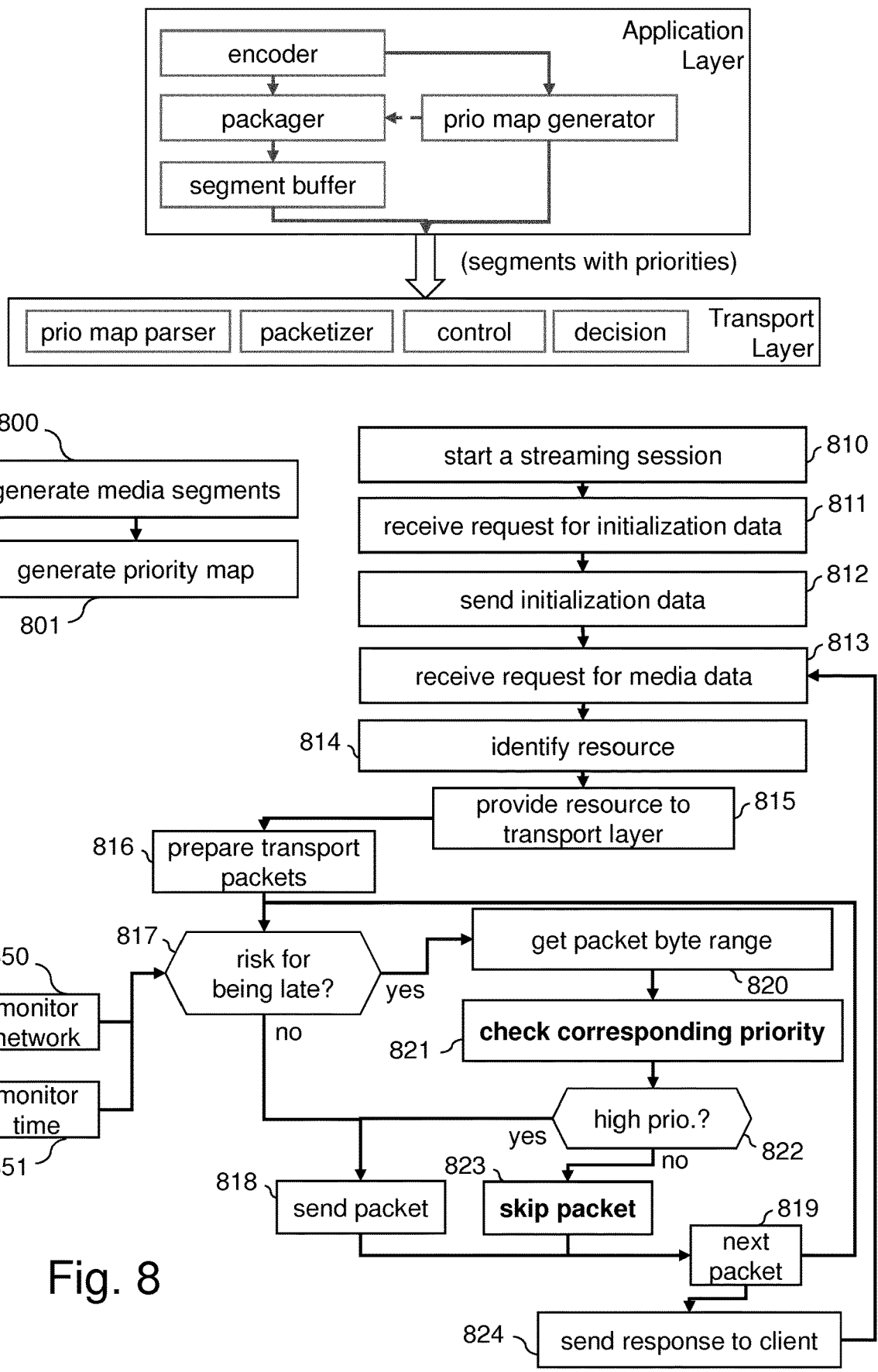

FIG. 8 illustrates a second example of use of a priority map, at a server's end, in a media streaming scenario between a server and a client, for example between server 110 and client 100 in FIG. 1.

FIG. 8 corresponds to the case where the data filtering or selection is performed at the transport layer. According to this example, the priority map is still generated at application layer but the parser for the priority map is part of the transport layer in addition to the packetizer and control and decision modules as shown at the top of FIG. 8.

Starting a streaming session between the server and the client is illustrated with step 810. The client and the server communicate with HTTP protocol. Both negotiate a transmission potentially in unreliable mode over HTTP. The server receives a request from the client for initialization data to actually start the streaming session with the negotiated mode and set up the media decoders (step 811). The server replies by sending initialization data (step 812). According to embodiments, the initialization data have the highest priority in the priority map. If some of the initialization data are determined as less important by the server when building the priority map, for example metadata described in user data boxes or free space, the server can send a subset of the initialization data to the client. Another kind of initialization data that can be considered as less important than the others is metadata describing alternative or switching tracks, for example in track selection box, when the streaming manifest has already been generated, since this information is provided to the client through the streaming manifest when starting the streaming session (step 810).

After the initialization data have been sent to the client (step 812), the server replies to the client with an HTTP response having the code 200 OK and the Content-Type HTTP header having, for example, the value "video/mp4" to indicate that the requested resource has been sent. When the server filters or selects parts of the initialization data to send to the client, depending on the priority map, it sends back (in step 812) an HTTP response having the code 200 OK but having the Content-Type sets to "video/paff" to indicate that the initialization data are partial but are sufficient to set up the decoder.

Next, the client starts requesting media data and thus, the server receives request for these data (step 813), for example as media segments, and identifies these corresponding resources (step 814). Next, the server provides the corresponding data from the media file to the transport layer (step 815). In the meantime, the priority map is provided to the transport layer. When the priority map is available from the beginning (i.e. not built in live), it can be transmitted once and for all from the application layer to the transport layer, for example when starting a streaming session.

Next, the transport layer initializes the packetizer (step 816) and the control module estimates transmission time for the first transport packet. This may be done based on accumulated statistics from previous client feedbacks and classical congestion control mechanisms (steps 817, 850, and 851). If there is a risk for the requested packet to be delayed, the transport layer checks the byte range for the first packet (step 820) and looks at its priority (step 821). This may done by the priority map parser. If the packet corresponds to byte ranges with high priority, it is sent over the network (step 818), otherwise it is skipped (step 823) and the transport layer processes the next packet (step 819). On the contrary, if there is no risk for the requested packet to be delayed (step 817), it is sent.

When there are no more packets to process, the transport layer informs the application layer with an indication of partial or full transmission. The application layer then sends the response to the client (step 824) either with a 200 OK message and indication of full resource or with a specific response, for example a 200 OK with partial content sent message (e.g. Content-Type: "video/paff"). This request-response is repeated until the end of the streaming session.

The combination of 200 OK with indication of partial content with "video/paff" may be replaced by a new specific HTTP code indicating that the server had no issue with the request but decided to send only most important parts of the resource. This sent resource provides an alternate or adapted version of the requested resource. It could be for example: 230 (or any unused 3 digit code indicating success from server in fulfilling the request but in a particular mode: unreliable mode and partial content sent). Indeed, a specific HTTP code may be defined to allow the client to keep on requesting full segments. The existing 206 code is a reply from the server to a byte range request by the client. The code 203 may be used to indicate that the streaming server "transforms" the requested resource.

In some cases, the server may answer to client's request with 200 OK and "video/paff" plus an indication of a response in multiple parts. Indeed, when the server selects a given processing level or priority value, the corresponding byte ranges might not correspond to contiguous byte ranges. The server then inserts in the HTTP response the HTTP header "Content-Type" with the value "multipart/byteranges" to describe and transmit each selected byte range as a part of the HTTP response. Of course, if some selected byte ranges are contiguous, they can be gathered into a single part in the HTTP response.

When the client negotiates an unreliable delivery mode with the server, this may imply partial file storage at client's end. The client may receive indication from the server on reliability of the sent data. This may be the case in FIG. 6b, where the server may indicate that selected and sent segments are all complete. This may be the case also as in FIG. 6c or 6d where, using the received byte ranges and the priority map, the client can store the data as partial file format with information on the source URL and received/missing parts of the data, using for example the PartialSegmentLocationBox 'ploc'. The client may embed the corresponding priority map within the so-stored Partial File. With such indication, the client's module handling the Partial File (e.g. control module 902 in FIG. 9 or control module 1014 in FIG. 10) may decide to forward to the application layer only the partial segments that are complete (to prevent parser or decoder crash).

This transmission mode consists in authorizing non-reliable delivery of the requested resources, which is a non-usual delivery with HTTP. In this transmission mode, a server (such as 101 in FIG. 1 or 320 in FIG. 3) receives a segment request by the client (such as 100 in FIG. 1 or 350 in FIG. 3). In addition to the modules represented in FIG. 2, the server has a priority map processor or parser to get priority for a byte range in the media file or media resource to transmit.

The server then identifies the requested resource and starts preparing transport packets.

The server delivers media segments as data chunks (as soon as they are produced on the server end by the media encoder and packager).

Figure 9:
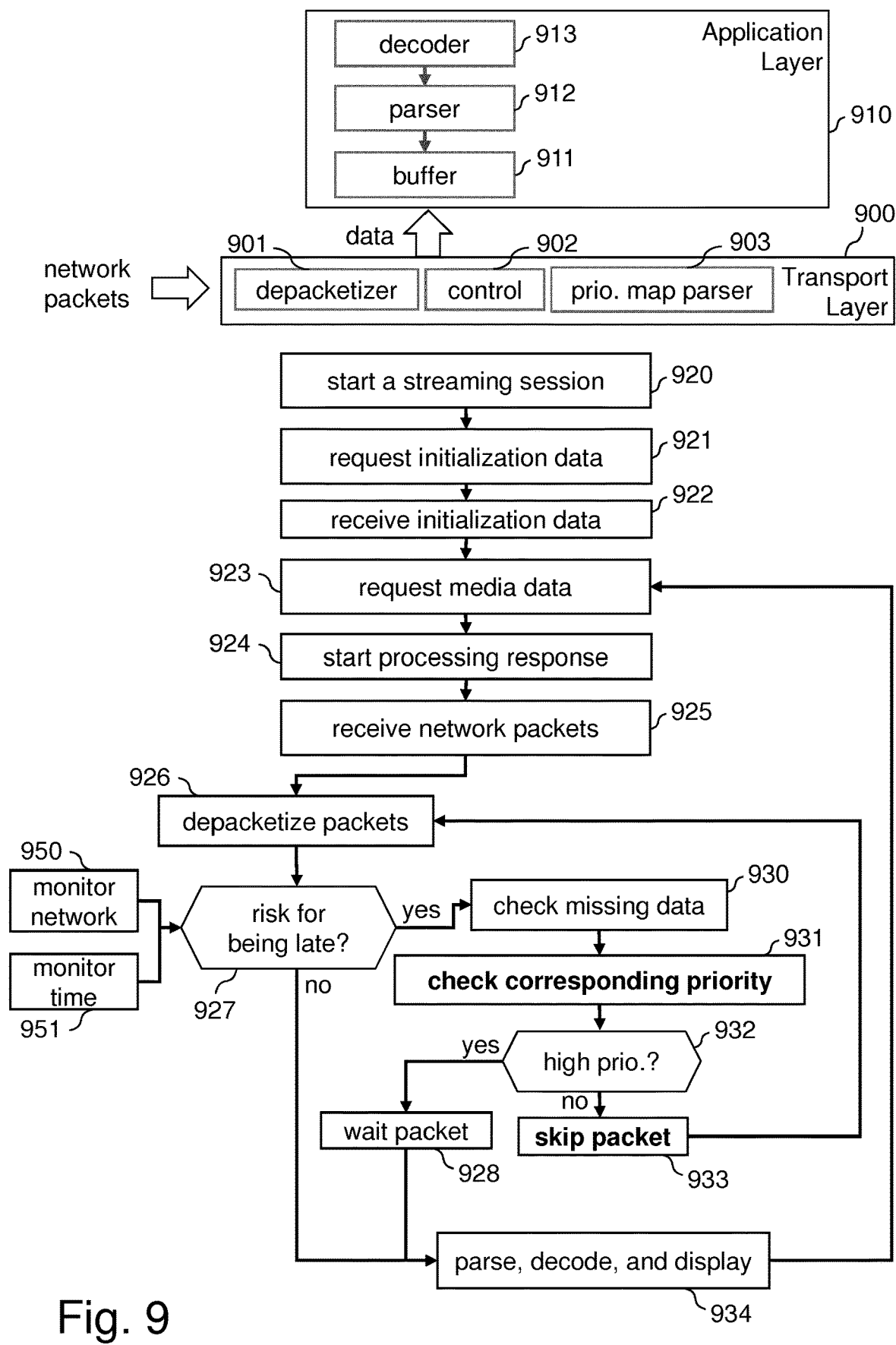
FIGS. 9 and 10 illustrate examples of the use of a priority map at the client's end.

FIG. 9 illustrates a first example of the use of a priority map at the client's end. According to this example, the priority map is available in the client transport layer. It may have been exchanged at session setup as metadata or all along the streaming session as part of the media data. In the latter case, the priority map is embedded in the media file at server side. The server may or may not interpret this priority map but sends it to the client as part of descriptive metadata of the media file. For example the priority map is described as part of the Partial Segment 'pseg' box.

The client is for example a streaming client as illustrated in FIG. 1 or FIG. 2. It comprises a transport layer (denoted 900 in FIG. 9) with a packet layer (e.g. packet layer 270 in FIG. 2) and optionally a stream layer (e.g. stream layer 265 in FIG. 2). This transport layer contains a depacketizer module 901 in charge of receiving and depacketizing the data received as transport packets over a transmission network. Once depacketized, data are transmitted to the application layer 910 and stored in a reception buffer 911. The application layer 910 contains a parser 912 that takes as input the encapsulated data from the reception buffer 911 and extracts compressed information to feed one or more media decoders 913.

Turning back to transport layer 900, the client contains a control module 902 in charge of monitoring the transmission. According to embodiments, control module 902 checks the arrival of transport packets, checks packet losses, handles retransmission requests for missing packets, and communicates feedback to the server. According to the illustrated example, the transport layer further comprises a priority map parser 903. It can be a simple JSON parser identifying the list of byte ranges with their associated priority levels.

The control module 902 checks the byte ranges for the received data. For example, when the QUIC protocol is used in the transport layer, this can be determined by reading the offset and length of QUIC STREAM frame. Then, using the priority levels of the priority map, the control module can determine whether data having high priority are missing or not and decide on whether or not the missing data should be retransmitted. On the contrary, if only data having low priority are missing, the control module 902 may acknowledge the corresponding packets (e.g. using ACK frames) as if they were received to avoid requesting retransmission and waiting for the packets.

Then, the priority map may be used as an input for the control module to handle a trade-off between waiting for request completion or requesting next segment. This may be useful for live transmission in which the client wants to avoid display freeze and to remain as close as live as possible. Such processing is further described according to steps 920 to 934.

As illustrated, the client starts a streaming session by establishing a connection with a streaming server (step 920). Both the streaming server and the client negotiate the transmission mode, for example unreliable mode and agree on exchange of partial data (for example using the Partial-FileStorage format). Next, the client requests initialization data (step 921) to setup its decoder(s) 913 after reception of the initialization data (step 922). After reception of the initialization data, the client starts requesting media data (step 923) and the application layer handles the HTTP response (924). The application layer may communicate the expected length of the content from the parsing of the Content-Length HTTP header.

Upon reception of the network packets corresponding to requested media by the transport layer (step 925), depacketizer 901 extracts the data from the packets. In the meantime, control module 902 checks network conditions (step 950) and monitors current time (step 951) to determine whether the packets risk to be late compared to real time (step 927), for example given the expected length of the requested content and the estimated bandwidth.

If there is a risk for some packets to arrive too late, control module 902 checks the missing byte ranges (step 930). Using priority information obtained from priority map parser 903 (steps 931 and 932), the control module can decide to wait for a packet (step 928) if its priority level is high, and to ask for a retransmission if the packet is considered lost. When the priority level is low (step 932), the control module can decide to skip the packet (step 933), for example to acknowledge the packet as if it was received, and keep on processing next packets. The received depacketized data are provided to the application layer for parsing (by parser 912), decoding (by decoder(s) 913), and displaying on the user interface of the client (not represented).

Figure 10:
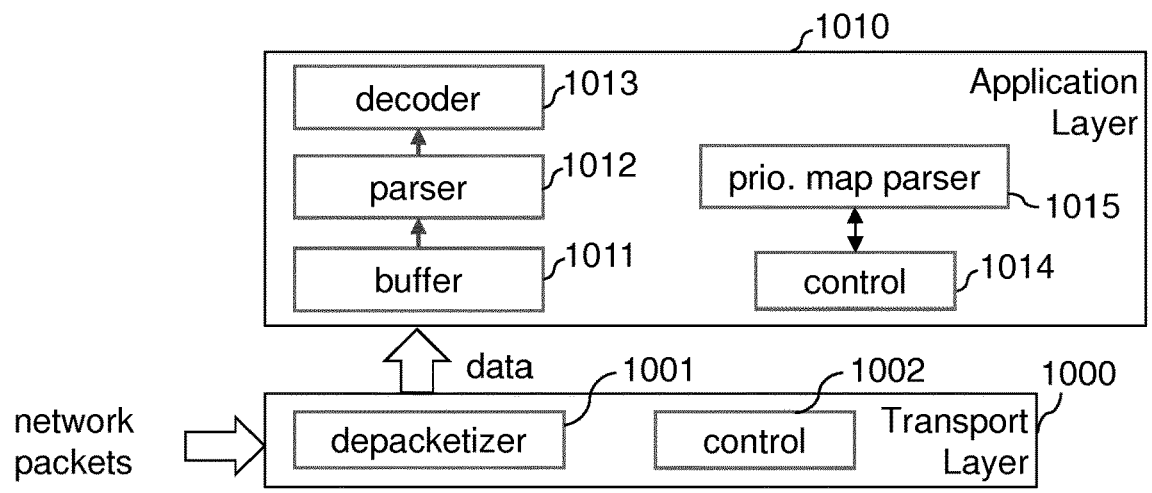
Figure 10:
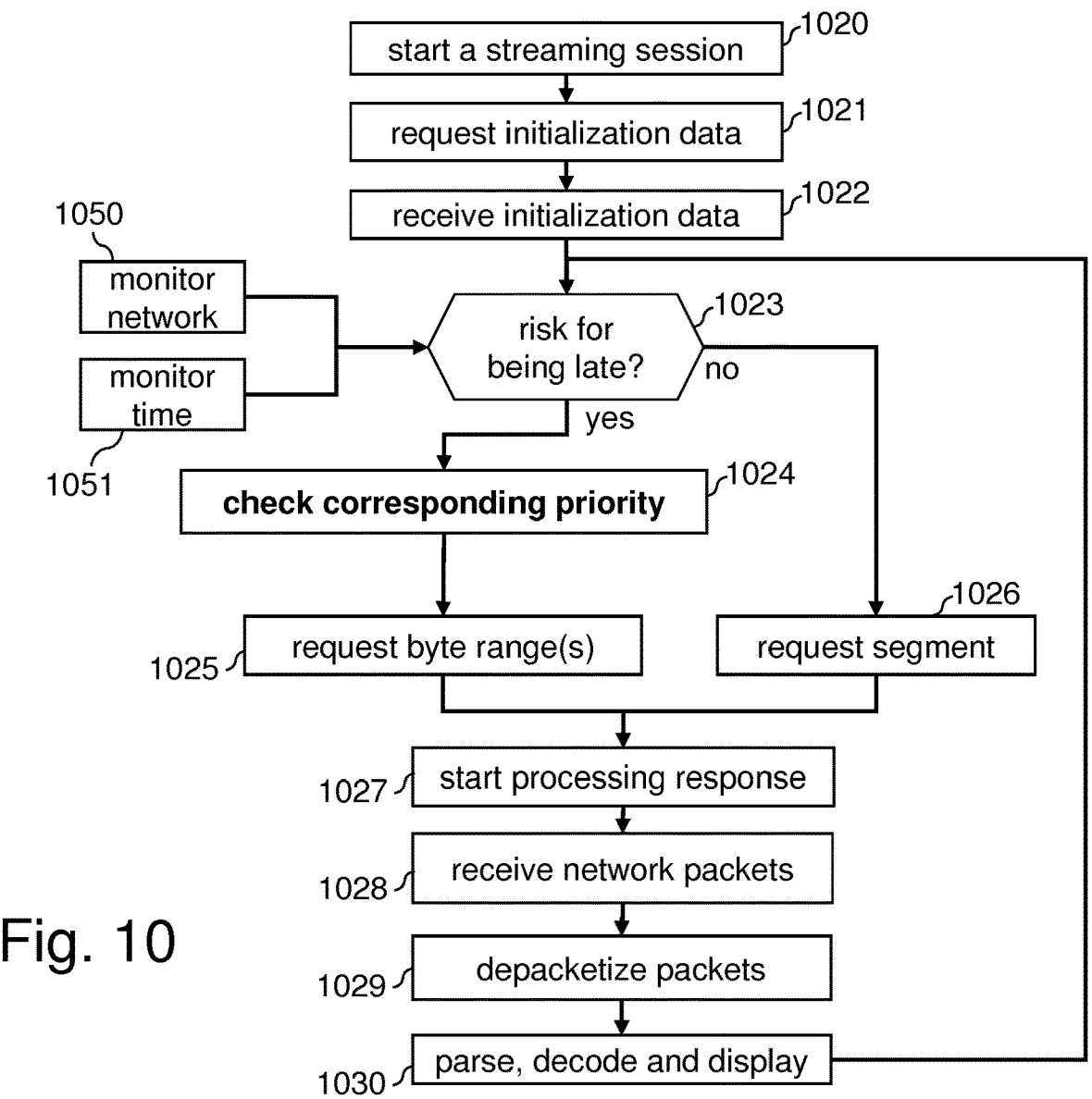

FIG. 10 illustrates a second example of the use of a priority map at the client's end, wherein the priority map is used in the client application layer.

In this embodiment, the client receives the priority map from the server or from another device. When it is received from the server, it may be sent within the initialization data (step 1022), during session establishment (step 1020) as a separate file, or along with media segments (for example in fragment header part like 'moof' or 'traf' ISOBMFF boxes, or as part of a partial segment when the server sends media using Partial File Format-ISO/IEC 23001-14), step 1024).

As illustrated, the application layer of the client, denoted 1010, contains a buffer 1011 that receives and temporally stores the received data. The received data can be encapsulated, for example with ISOBMFF or Partial File Format (ISO/IEC 23001-14). The application layer also has file format parser for these encapsulated data (parser 1012). This parser extracts the compressed bit streams (e.g. video bit stream or audio bit stream) and provides those to the media decoder(s) denoted 1013 in FIG. 10. As illustrated, the application layer further comprises a control or monitoring module 1014 that is in charge of continuously or periodically computing statistics on transmission (e.g. available bandwidth, round-trip-time, and during step 1050). In case of live streaming use, control module 1014 is also monitoring data arrival time against a reference clock (sometimes called wall-clock time) to determine relevance of arriving data compared to live (step 1051).

According to the illustrated embodiment, application layer 1010 also comprises a priority map parser 1015. As described above, the priority map may be part of the data received via transport layer 1000. It reads the priority map and provides for a given byte range the associated priority level. Priority map parser 1015 communicates with control module 1014 that has a specific API to communicate with a control module 1002 of the transport layer 1000. For example, the application layer can indicate the transport layer to not wait for late packets and cancel an on-going request (or consider it is fulfilled). In case of cancel instruction, control module 1002 may acknowledge non-received packets (e.g. using ACK Frames) to avoid waiting for retransmission of missing data.

An example of typical exchanges, for example using HTTP, between the client and a server are illustrated in FIG. 10 with references 1020 to 1030.

In a first step, the client establishes a connection with the server to start a streaming session (step 1020). At startup, the client may receive a description of the media file, like a DASH MPD, an HLS playlist, or a Smooth Streaming manifest. Next, the client requests initialization data (step 1021). The received initialization data (step 1022) make it possible for the client to setup the parser and decoder at application layer. After having received the initialization data, the media streaming starts, segment after segment. At this stage, the client may take advantage of the priority map.

If control module 1014 detects a potential delay compared to live time (step 1023), the control module may look in the priority map which parts of the next segment to request are the most important (step 1024). Then, the segment is requested as one or more byte ranges, given their priority order (step 1025). Otherwise, the whole segment is requested (step 1026). The response from the server is received and processed (step 1027) and network packets are received at the transport layer (step 1028). The received packets are depacketised (step 1029) and transmitted to buffer 1011 of application layer 1010 for parsing, decoding and rendering (step 1030).

Next, the client prepares the request for the next segment (the algorithm is branched to step 1023). This is repeated until the end of the media presentation or until the end of the session.

According to other embodiments, a priority map may be used in origin servers to populate cache servers in a content distribution network, for example starting with data corresponding to highest priority levels. Then, the transmission of ISOBMFF or partial ISOBMF files (ISO/IEC 23001-14)

may benefit from the priority map at client's end but also in intermediate nodes on the network. Indeed, on a cache server or intermediate node on the network, the media resource may be stored as Partial File Format and redistributed in this same format. It may then be useful for the cache server or intermediate node on the network to have a priority map processor. For example, the cache server or intermediate node on the network may further filter the data from the Partial File Format to send only high priority data (priority_type="priorities" or segments indicated as "reliable" in a priority map with purpose or nature equal to "reliability". For example, some broadcast mechanisms (FLUTE, HbbTV) may deliver files through broadcast, usually to populate a cache. This is done by assigning to the broadcasted resource an HTTP URL. However, there are use cases where some resource header fields are also carried in the broadcast, such as cache directive, CORS related header fields (Cross-Origin Resource Sharing, W3C Recommendation available at https://www.w3.org/TR/cors/) or other HTTP meta-data. Both ISOBMFF and PartialFileFormat (ISO/IEC 23001-14) could benefit from a way of storing HTTP header fields. In an embodiment of the invention, in combination with the priority map or without inclusion of a priority map, ISOBMFF-based media files (e.g. HEIF, MIAF, CMAF, or OMAF) are also extended to store HTTP header fields in their box structure. A new box is defined for this purpose (box names and types 'htte' are used as examples, and any reserved code or name can be used):

| Box Type: | 'htte' |
|---|---|
| Container: | PartialSegmentBox or PartialFileHeaderBox |
| Mandatory: | No |
| Quantity: | At most one per PartialSegmentBox, or one in PartialFileHeaderBox |

The HTTPEntityBox is used to store a set of HTTP header fields (the HTTP header name and value) applying to the resource identified by the source URL. It is typically inserted in PartialFileHeaderBox or PartialSegmentBox by the receiver, and can be used by the receiving entity to populate an HTTP cache. There may be several HTTPEntityBox in a partial file. HTTPEntityBox boxes declared in a PartialFileHeaderBox define HTTP header fields valid for the entire partial file. HTTPEntityBox boxes declared in a PartialSegmentBox define HTTP header fields valid for the partial segment only.

This new box, when embedded in ISOBMFF or derived specifications has the following syntax:

```
aligned(8) class HTTPEntityBox extends FullBox('htte, 0, 0) {
    unsigned int (32) entry_count;
    for (i=0; i<entry_count; i ++) {
        string name;
        string body;
    }
}
```

This new box has the following semantics:
entry_count indicates the number of HTTP header fields in this box,
name gives the name of the HTTP header field described; this field is a NULL-terminated C string encoded in UTF-8,
body gives the body (content) of the HTTP header value described; this field is a NULL-terminated C string encoded in UTF-8.

Usually, an HTTPEntityBox only contains header fields corresponding to the resource described. This means that these header fields are header fields used for describing an HTTP response. The header fields include for example cache directives, CORS header fields . . . .

However, in some cases it can be useful to also include request header fileds in the HTTPEntityBox. This is the case for example when the header fields correspond to an HTTP response that depends on some header fields from a corresponding HTTP request. For example, the HTTP request could include an 'Accept-Language: en, fr' header field, indicating that the preferred language for the HTTP resource are in order English, then French. The HTTP response could include the following header fields to indicate how it took this language request into account:
Vary: accept-language
Content-Language: en Several header fields can be used to express the dependency of an HTTP response on some HTTP request header fields: 'Vary', which is defined in the HTTP specification, but also 'Key', and 'Variants' that are proposed improvements over 'Vary'.

Header fields corresponding to an HTTP request can be stored as it in the HTTPEntityBox. In most cases, the name of the header field is sufficient to determine whether it correspond to a request or a response. In an alternate embodiment, a flag could be added to teach entry to indicate whether it is a request or response header field.

FIG. 11 is a schematic block diagram of a computing device 1100 for implementation of one or more embodiments of the invention. The computing device 1100 may be a device such as a micro-computer, a workstation or a light portable device. The computing device 1100 comprises a communication bus connected to:

- a central processing unit (CPU) 1101, such as a microprocessor;
- a random access memory (RAM) 1102 for storing the executable code of the method of embodiments of the invention as well as the registers adapted to record variables and parameters necessary for implementing the method for reading and writing the manifests and/or for encoding the video and/or for reading or generating data under a given file format, the memory capacity thereof can be expanded by an optional RAM connected to an expansion port for example;
- a read only memory (ROM) 1103 for storing computer programs for implementing embodiments of the invention;
- a network interface 1104 that is, in turn, typically connected to a communication network over which digital data to be processed are transmitted or received. The network interface 1104 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1101;

a user interface (UI) 1105 for receiving inputs from a user or to display information to a user;

a hard disk (HD) 1106;

an I/O module 1107 for receiving/sending data from/to external devices such as a video source or display.

The executable code may be stored either in read only memory 1103, on the hard disk 1106 or on a removable digital medium for example such as a disk. According to a variant, the executable code of the programs can be received by means of a communication network, via the network interface 1104, in order to be stored in one of the storage means of the communication device 1100, such as the hard disk 1106, before being executed.

The central processing unit 1101 is adapted to control and direct the execution of the instructions or portions of software code of the program or programs according to embodiments of the invention, which instructions are stored in one of the aforementioned storage means. After powering on, the CPU 1101 is capable of executing instructions from main RAM memory 1102 relating to a software application after those instructions have been loaded from the program ROM 1103 or the hard-disc (HD) 306 for example. Such a software application, when executed by the CPU 1101, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of receiving, by a client, one or more byte-ranges of a source file, from a server, the method comprising:

requesting, by the client, in a HTTP request comprising HTTP header fields, the one or more byte-ranges, to the server;

receiving, by the client, a HTTP response comprising HTTP header fields and a payload part comprising at least some of the requested one or more byte-ranges, all the requested one or more byte-ranges of the HTTP response belonging to the payload part; and generating a file complying with an ISOBMFF-based file-format, by the client, storing in the file at least some of the received one or more byte-ranges, and storing in the file a part of the HTTP header fields from the HTTP request and/or a part of the HTTP header fields from the HTTP response.

2. The method of claim 1, wherein the HTTP header fields are stored in an area of the file, complying with a Partial File Format according to ISO/IEC 23001-14, that contains information for the entire file.

3. The method of claim 1, wherein the HTTP header fields are stored in a partial segment box of the file, complying with a Partial File Format according to ISO/IEC 23001-14, that contains information for a determined source.

4. The method of claim 1, wherein the client obtains the one or more byte-ranges by using the stored header fields.

5. The method of claim 1, wherein the file complying with an ISOBMFF-based file-format is a file complying with a Partial File Format according to ISO/IEC 23001-14.

6. The method of claim 1, wherein the client populates an HTTP cache with the stored HTTP header fields and received byte-ranges.

7. A non-transitory computer-readable storage medium storing instructions of a computer program for receiving one or more byte-ranges of a source file, from a server, the instructions comprising:

requesting instructions to request, in a HTTP request comprising HTTP header fields, the one or more byte-ranges, to the server;

receiving instructions to receive a HTTP response comprising HTTP header fields and a payload part comprising at least some of the requested one or more byte-ranges, all the requested one or more byte-ranges of the HTTP response belonging to the payload part; and generating instructions to generate a file complying with an ISOBMFF-based file-format, to store in the file at least some of the received one or more byte-ranges, and to store in the file a part of the HTTP header fields from the HTTP request and/or a part of the HTTP header fields from the HTTP response.

8. A device for a client for receiving one or more byte-ranges of a source file, from a server, the device comprising:

a processor; and a memory storing executable instructions which, when executed by the processor, cause the device to perform operations including:

requesting instructions to request, in a HTTP request comprising HTTP header fields, the one or more byte-ranges, to the server;

receiving instructions to receive a HTTP response comprising HTTP header fields and a payload part comprising at least some of the requested one or more byte-ranges, all the requested one or more byte-ranges of the HTTP response belonging to the payload part; and generating instructions to generate a file complying with an ISOBMFF-based file-format, to store in the file at least some of the received one or more byte-ranges, and to store in the file a part of the HTTP header fields from the HTTP request and/or a part of the HTTP header fields from the HTTP response.

\* \* \* \* \*